United States Patent
White et al.

(10) Patent No.: US 9,967,289 B2
(45) Date of Patent: May 8, 2018

(54) CLIENT SERVICES FOR APPLIED KEY MANAGEMENT SYSTEMS AND PROCESSES

(71) Applicant: Fornetix LLC, Leesburg, VA (US)

(72) Inventors: Charles White, Charles Town, WV (US); Stephen Edwards, Stepherdstown, WV (US)

(73) Assignee: FORNETIX LLC, Leesburg, VA (US)

( * ) Notice: Subject to any disclaimer, the term of this patent is extended or adjusted under 35 U.S.C. 154(b) by 189 days.

(21) Appl. No.: 15/067,814

(22) Filed: Mar. 11, 2016

(65) Prior Publication Data

US 2016/0269364 A1     Sep. 15, 2016

Related U.S. Application Data

(60) Provisional application No. 62/132,379, filed on Mar. 12, 2015, provisional application No. 62/300,717, filed on Feb. 26, 2016, provisional application No. 62/300,521, filed on Feb. 26, 2016, provisional application No. 62/300,699, filed on Feb. 26, 2016, provisional application No. 62/300,687, filed on Feb. 26, 2016, provisional application No. 62/300,352, filed on Feb. 26, 2016, provisional application No. 62/300,670, filed on Feb. 26, 2016.

(51) Int. Cl.
*H04L 29/06* (2006.01)
*G06F 21/60* (2013.01)

(52) U.S. Cl.
CPC ............ *H04L 63/20* (2013.01); *G06F 21/602* (2013.01); *H04L 63/061* (2013.01)

(58) Field of Classification Search
CPC ...... H04L 63/20; H04L 63/061; G06F 21/602

USPC ......................................................... 713/165
See application file for complete search history.

(56) References Cited

U.S. PATENT DOCUMENTS

| | | |
|---|---|---|
| 7,607,164 B2 | 10/2009 | Vasishth et al. |
| 8,116,456 B2 | 2/2012 | Thomas |
| 8,213,620 B1 | 7/2012 | Sussland et al. |
| 8,214,636 B2 | 7/2012 | Kapoor |
| 8,538,028 B2 | 9/2013 | Yeap et al. |
| 8,793,508 B2 | 7/2014 | Von Behren et al. |

(Continued)

FOREIGN PATENT DOCUMENTS

| | | |
|---|---|---|
| EP | 1 396 979 A2 | 3/2004 |
| WO | WO-03/073762 | 9/2003 |

OTHER PUBLICATIONS

PCT International Search Report and Written Opinion dated Jul. 12, 2016, from related application No. PCT/US2016/022360.

(Continued)

*Primary Examiner* — Mohammad W Reza
(74) *Attorney, Agent, or Firm* — Foley & Lardner LLP

(57) ABSTRACT

Embodiments described herein relate to apparatuses and methods for enabling applied key management operations at a client including establishing a data connection with a file kernel driver of the client to enable the applied key management operation, receiving a request pertaining to encryption key data, relaying the request pertaining to the encryption key data to an applied key management system, and receiving a response regarding the request from the applied key management system based on at least one policy of the applied key management system.

21 Claims, 12 Drawing Sheets

(56) References Cited

U.S. PATENT DOCUMENTS

| | | |
|---|---|---|
| 2002/0124086 A1 | 9/2002 | Mar |
| 2004/0039594 A1 | 2/2004 | Narasimhan et al. |
| 2004/0073928 A1 | 4/2004 | Alakoski et al. |
| 2004/0247131 A1 | 12/2004 | Buer |
| 2005/0039031 A1 | 2/2005 | Mont et al. |
| 2006/0190722 A1 | 8/2006 | Sharma et al. |
| 2006/0233363 A1 | 10/2006 | Graunke |
| 2006/0239263 A1† | 10/2006 | Torronen et al. |
| 2007/0011736 A1 | 1/2007 | Kalibjian et al. |
| 2007/0280483 A1 | 12/2007 | Fu et al. |
| 2008/0077794 A1 | 3/2008 | Arnold et al. |
| 2008/0209221 A1* | 8/2008 | Vennelakanti ........ H04L 63/062 713/183 |
| 2009/0083209 A1 | 3/2009 | Corl et al. |
| 2009/0092252 A1 | 4/2009 | Noll et al. |
| 2009/0178106 A1 | 7/2009 | Feng et al. |
| 2009/0240725 A1 | 9/2009 | Curtis et al. |
| 2010/0246827 A1 | 9/2010 | Lauter et al. |
| 2010/0246828 A1 | 9/2010 | Johnston |
| 2010/0299759 A1* | 11/2010 | Kim ........................ G06F 21/10 726/28 |
| 2011/0072274 A1 | 3/2011 | Leoutsarakos et al. |
| 2011/0113235 A1 | 5/2011 | Erickson |
| 2011/0131275 A1 | 6/2011 | Maida-Smith et al. |
| 2011/0164747 A1 | 7/2011 | Junod et al. |
| 2011/0173202 A1 | 7/2011 | Paknad et al. |
| 2011/0296173 A1 | 12/2011 | Agrawal et al. |
| 2012/0099728 A1 | 4/2012 | Rich et al. |
| 2012/0110328 A1 | 5/2012 | Pate et al. |
| 2012/0143876 A1 | 6/2012 | Srinivasan et al. |
| 2013/0044878 A1* | 2/2013 | Rich ..................... H04L 63/062 380/277 |
| 2013/0044882 A1 | 2/2013 | Rich et al. |
| 2013/0097123 A1 | 4/2013 | McColgan et al. |
| 2013/0232336 A1 | 9/2013 | Cheung et al. |
| 2013/0262866 A1 | 10/2013 | Gu |
| 2013/0268753 A1 | 10/2013 | Vanderpol et al. |
| 2014/0013110 A1 | 1/2014 | Thoniel et al. |
| 2014/0095890 A1 | 4/2014 | Mangalore et al. |
| 2014/0122895 A1 | 5/2014 | Khosravi et al. |
| 2014/0201850 A1† | 7/2014 | Garcia et al. |
| 2014/0229736 A1 | 8/2014 | Asim et al. |
| 2014/0365764 A1 | 12/2014 | Buer |
| 2015/0086020 A1 | 3/2015 | Harjula et al. |
| 2015/0095970 A1 | 4/2015 | Shetty et al. |
| 2015/0101012 A1 | 4/2015 | White et al. |
| 2015/0106626 A1 | 4/2015 | Kremp et al. |
| 2015/0319146 A1 | 11/2015 | Chen et al. |
| 2015/0358153 A1 | 12/2015 | Gentry |
| 2016/0044003 A1 | 2/2016 | Raykova et al. |

OTHER PUBLICATIONS

International Search Report and Written Opinion dated Aug. 30, 2016, from related application No. PCT/US2016/022363.
International Search Report and Written Opinion dated Aug. 30, 2016, from related application No. PCT/US2016/022366.
Chae, et al, "A Key Recovery Attack on Discrete Log-based Schemes Using a Prime Order Subgroup", ICRC 2010, pp. 249-262.
International Preliminary Report on Patentability dated Sep. 21, 2017, from application No. PCT/US2016/022357.
International Preliminary Report on Patentability dated Sep. 21, 2017, from application No. PCT/US2016/022360.
International Preliminary Report on Patentability dated Sep. 21, 2017, from application No. PCT/US2016/022363.
International Preliminary Report on Patentability dated Sep. 28, 2017, from application No. PCT/US2016/022366.
U.S. Office Action dated Oct. 27, 2017, from U.S. Appl. No. 15/067,084.
International Search Report and Written Opinion dated Jun. 1, 2017, from related application No. PCT/US2017/019202.
International Search Report and Written Opinion dated Jun. 2, 2017, from related application No. PCT/US2017/019162.
International Search Report and Written Opinion dated Jun. 2, 2017, from related application No. PCT/US2017/019205.
International Search Report and Written Opinion dated Jun. 2, 2017, from related application No. PCT/US2017/019209.
International Search Report and Written Opinion dated May 24, 2017, from related application No. PCT/US2017/019204.
International Search Report and Written Opinion dated May 30, 2017, from related application No. PCT/US2017/019207.
PCT International Search Report and Written Opinion dated Jun. 29, 2016, from related application No. PCT/US2016/022357.
U.S. Office Action dated Dec. 26, 2017, from U.S. Appl. No. 15/067,074.

\* cited by examiner
† cited by third party

CLIENT SERVICES FOR APPLIED KEY MANAGEMENT SYSTEMS AND PROCESSES

CROSS-REFERENCE TO RELATED PATENT APPLICATIONS

The present disclosure claims priority to, and the benefit of, U.S. provisional patent application Ser. No. 62/132,379, titled Client Services For Key Orchestration System And Process, and filed on Mar. 12, 2015, which is incorporated herein by reference in its entirety. The present disclosure claims priority to, and the benefit of, U.S. provisional patent application Ser. No. 62/300,352, titled Policy-Enabled Encryption Keys Having Complex Logical Operations, and filed on Feb. 26, 2016, which is incorporated herein by reference in its entirety. The present disclosure claims priority to, and the benefit of, U.S. provisional patent application Ser. No. 62/300,521, titled Policy-Enabled Encryption Keys Having Ephemeral Policies, and filed on Feb. 26, 2016, which is incorporated herein by reference in its entirety. The present disclosure claims priority to, and the benefit of, U.S. provisional patent application Ser. No. 62/300,670, titled Structure Of Policies For Evaluating Key Attributes Of Encryption Keys, and filed on Feb. 26, 2016, which is incorporated herein by reference in its entirety. The present disclosure claims priority to, and the benefit of, U.S. provisional patent application Ser. No. 62/300,687, titled Linking Encryption Key Management With Granular Policy, and filed on Feb. 26, 2016, which is incorporated herein by reference in its entirety. The present disclosure claims priority to, and the benefit of, U.S. provisional patent application Ser. No. 62/300,699 titled System And Method For Associating Encryption Key Management Policy With Device Activity, and filed on Feb. 26, 2016, which is incorporated herein by reference in its entirety. The present disclosure claims priority to, and the benefit of, U.S. provisional patent application Ser. No. 62/300,717, titled System And Method For Hierarchy Manipulation In An Encryption Key Management System, and filed on Feb. 26, 2016, which is incorporated herein by reference in its entirety. The present disclosure relates to U.S. utility patent application titled System And Method For Encryption Key Management Federation And Distribution (Ser. No. 14/506,346), which is incorporated herein by reference in its entirety.

BACKGROUND

1. Field of the Invention

Embodiments of the present invention relate generally to security objects used in communication systems and, more specifically, to generation, management, distribution, federation, and/or applied key management of security objects.

2. Background

In security systems, an encryption key refers to a parameter or data that dictates how plain data may be translated into encrypted data during an encryption process and encrypted data into plain data during a decryption process. Typically, the encryption key is made available both of a source device (e.g., a transmitting device) and a target device (e.g., a receiving device) in a communication transaction. Given that encryption keys are used pervasively, effective management of the encryption keys (as well as other security objects) to defend and respond to threats against the security systems is of paramount importance.

Traditionally, encryption key management is initiated and executed at the device level (e.g., by the source device and/or the target device that are involved in the communication transaction). Communication management, on the other hand, is traditionally centrally managed at a higher level (e.g., by a server for the source device and target device). The end result may be that the encryption management is procedurally unsynchronized with communications management. Thus, loose controls of encryption keys, as demonstrated in current public key infrastructure (PKI) instances, may result. In addition, loose controls of symmetric keys generated and distributed in an enterprise may also occur. Accordingly, an end result may be a breakdown in communication management or communication security. Similar problems confront other types of encryption objects.

Conventionally, no mechanism exists to automate obtaining and registering of keys across various local user applications at a communication device. Secure Shell (SSH) and other interface/protocol for system access conventionally focus on localized generation of encryption keys for user authentication. Some applications such as, but not limited to, messaging, communication applications, and the like may require separate distribution of symmetric and/or asymmetric keys for encrypted communications. Storage or distribution of encrypted information may require separate key management and distribution activities.

SUMMARY OF THE DISCLOSURE

Embodiments described herein relate to providing a client-based service for integrating local applications, servers, and/or infrastructure with applied key management operations (including evaluations based on policies) provided by an encryption applied key management system or server. A client (e.g., a communication device) may have local applications, servers, and/or infrastructure that do not have defined applied encryption key management capacities or interfaces natively. Thus, the client-based service may serve as an interface between the applied encryption key management system and one or more of the local applications, servers, and/or infrastructure of the client.

In some embodiments, the client-based service may include an applied key management client interface to enable automated collection of key file materials in the client and communication and requesting services with an external applied key management system. Uses of the key file materials may include, but are not limited to, local user disk encryption, secure communication, application license keys, and the like. Accordingly, embodiments described herein are concerned with interfacing with the applied encryption key management system to enable local applied encryption key management-related functionality.

According to various embodiments, there is provided a method for enabling applied key management operations at a client including: establishing a data connection with a file kernel driver of the client to enable the applied key management operation, receiving a request pertaining to encryption key data, relaying the request pertaining to the encryption key data to an applied key management system, and receiving a response regarding the request from the applied key management system based on at least one policy of the applied key management system.

In some embodiments, the request includes a request to register the encryption key data with the applied key management system.

In some embodiments, the request includes a request to send the encryption key data.

In some embodiments, the method further includes retrieving the encryption key data from a local key store at the client, and sending the encryption key data.

In some embodiments, the request includes a request for recertification or for rekeying.

In some embodiments, the encryption key data includes one of a certificate, a key store, a symmetric key, or an asymmetric key.

In some embodiments, the method further includes receiving a key that complies with the at least one policy from the applied key management server, and relaying the key to an application plugin at the client for data encryption.

In some embodiments, the method further includes closing the connection with the file kernel driver after receiving the response from the applied key management system.

In some embodiments, the established connection with the file kernel driver is a Netlink connection.

In some embodiments, the response includes a denial of the request based on the at least one policy of the applied key management system.

According to various embodiments, a system for enabling applied key management operations at a client includes: a memory and a processor configured to: establish a data connection with a file kernel driver of the client to enable the applied key management operation, receive a request pertaining to encryption key data, relay the request pertaining to the encryption key data to an applied key management system, and receive a response regarding the request from the applied key management system based on at least one policy of the applied key management system.

In some embodiments, the request includes a request to register the encryption key data with the applied key management system.

In some embodiments, the request includes a request to send the encryption key data.

In some embodiments, the processor is further configured to: retrieve the encryption key data from a local key store at the client, and send the encryption key data.

In some embodiments, the request includes a request for recertification or for rekeying.

In some embodiments, the encryption key data includes one of a certificate, a key store, a symmetric key, or an asymmetric key.

In some embodiments, the processor is further configured to receive a key that complies with the at least one policy from the applied key management server, and relay the key to an application plugin at the client for data encryption.

In some embodiments, the processor is further configured to close the connection with the file kernel driver after receiving the response from the applied key management system.

In some embodiments, the established connection with the file kernel driver is a Netlink connection.

In some embodiments, the response includes a denial of the request based on the at least one policy of the applied key management system.

DETAILED DESCRIPTION

Figure 1:
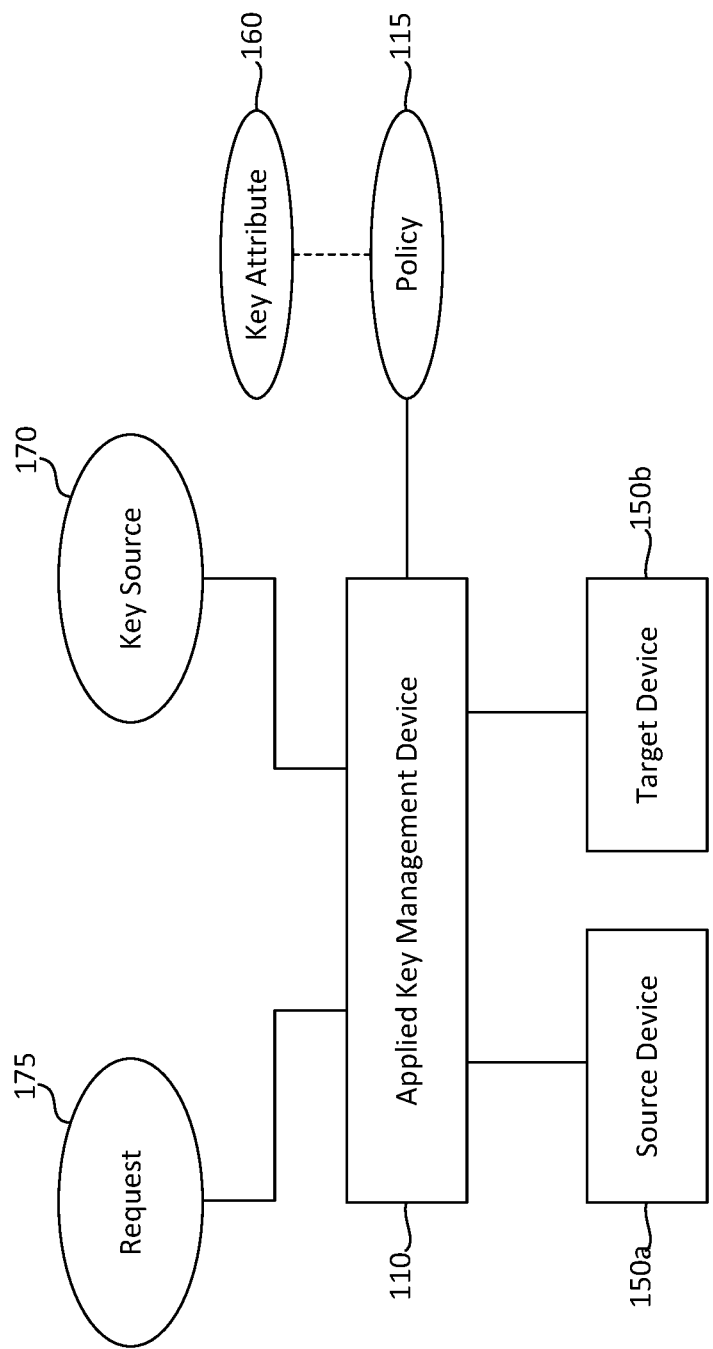
FIG. 1 is a schematic block diagram illustrating an example of a general encryption applied key management system according to various embodiments.

In the following description of various embodiments, reference is made to the accompanying drawings which form a part hereof and in which are shown by way of illustration specific embodiments in which the embodiments may be practiced. It is to be understood that other embodiments may be utilized, and structural changes may be made without departing from the scope of the various embodiments disclosed in the present disclosure.

Embodiments described herein generally relate to security object applied key management. The security object applied key management may include management, distribution, and federation of the security object. Security objects may include encryption keys and other sensitive objects (such as, but not limited to, user identity information, certificates, biometric data, random number generator data, determinate random number generator data, non-determinate random number generator data, user authentication information, policy components, other components associated with organization security component, and/or the like). In the present disclosure, encryption key-based applied key management is described in various embodiments as examples of the security object applied key management systems and methods. It should be appreciated that the applied key management systems and methods are likewise applicable to other security objects, including those described above.

As used herein, "applied key management" may refer to a combination of key management, key federation, and key distribution activities in one or more enterprises. For example, embodiments described may be associated with the applied key management of encryption key information correlated with utilizing encryption in the one or more enterprises. "Enterprise key management" may include managing and/or overseeing the multiple uses of asymmetric and symmetric keys required for encrypting data, signing emails, authenticating web services, and/or other potential uses. This may also include encryption management for communications systems to include radio, cellular, satellite and internet protocol based communications. "Enterprise key federation" may include coordinating and negotiating the federation of key information to a plurality of disparate applied key management platforms (each associated with disparate federating organizations) based on established trust between the federating organizations (e.g., the enterprises). "Key distribution" may refer to a centralized distribution (e.g., pushing or forwarding) of key material to support encryption operations within a local enterprise and/or a foreign enterprise. In particular, key distribution may be concerned with assigning or otherwise transmitting the appropriate encryption keys to an appropriately associated device (e.g., the communication device, which may either be a source device or a target device).

Embodiments of applied key management (e.g., an applied key management device such as a management request handler coupled to a request handler and various supporting databases) may provide control of encryption key management, federation, and distribution through a centralized user interface. Such applied key management devices may provide centralized systems and/or methods of managing encryption keys associated with communications, infrastructure, and applications. Such applied key management devices may also manage device enrollment, monitor device health related to encryption capabilities, and monitor status for applied key management activities. Such capabilities may allow robust transaction reporting to support audit activities associated with communications, application, and infrastructure management.

Applied key management may be leveraged for additional systems other than the communication systems. Other implementations of applied key management may include application encryption management, virtualization encryption management, storage encryption management, and/or user identity encryption management. In short, if applications, communications, or infrastructures require use of encryption (or other types of security mechanisms using security objects) and keys (or security objects), applied key management may be applied to provide advantages as described. Communication systems may include, but are not limited to, radio communications, cellular communications, transmission control protocol/internet protocol (TCP/IP) based communications, satellite communications equipment, and the like. Application systems may include, but are not limited to voice-over-internet protocol VOIP applications, virtualization, identification and authentication, messaging, local storage. Infrastructure systems may include, but are not limited to storage solutions, physical security infrastructure, and medical equipment.

In particular embodiments, an applied key management device may enable encryption key lifecycle activities across multiple types of communication devices in a centralized manner. The applied key management device may leverage industry standards for key management for interoperability with existing systems and may use, for example, protocols for applied key management as a part of applied key management. A distinction between applied applied key management and key management alone may be demonstrated in encryption key management and key distribution for communication systems. Given the requirement to make new encryption connections before breaking existing connections, typical communication systems cannot utilize rekey commands as it would break communications before management steps are taken to establish new lines of communications. However, rekey commands may work for infrastructure—to include storage, applications and virtualization solutions—where services can be reestablished without loss of centralized control of the managed capability.

The system architecture of applied key management can be configured to allow for use of a standard-based approach for supported systems such as key management interoperability protocol (KMIP), for example, but also the capability to develop support interfaces for non-standardized systems such as physical security infrastructure, virtualization applications, satellite communications systems, and medical equipment. This may be accomplished by architecturally separating message handling from support interfaces. Using a purely KMIP example, a storage device may receive a "rekey" command, a communication equipment may receive "put-and-notify" commands, and cellular devices may request queued "notify" commands informing the cellular devices to send "get messages" to the applied key management device to be relayed to key management and generation system components. Example systems implementing such features are discussed below.

Embodiments described herein may include an applied key management device to implement centralized, top-down enterprise encryption key management encryption keys (e.g., such as, but not limited to symmetric key encryption, asymmetric key encryption, and the like) as well as other security objects used in security systems. Such centralized, top-down control of encryption may be for a given enterprise. Embodiments may include implementing coordinated KMIP on enterprise key management, communications systems, applications, and infrastructure for encryption key lifecycle functions implementing at least one of: device registration, user registration, system and user initialization, key material installation, key establishment, key registration, operational use, key storage, key distribution, key update, key recovery, key de-registration, key destruction, key revocation, and the like.

As referred to herein, a "key attribute" (attribute, encryption attribute, and/or the like) associated with an encryption key may refer to a characteristic associated with the encryption key, cryptographic or security characteristics of the encryption key, the cryptographic algorithms of the encryption key, a device generating/transmitting/receiving the encryption key, a user of the device, and/or the like. Each encryption key may be associated with at least one key attribute. The encryption key may be transmitted and/or received with its associated key attributes represented in data values.

As referred to herein, a "policy" may be a rule managing an encryption key based on key attribute(s) associated with that encryption key. In particular embodiments, a policy may dictate whether the particular encryption key is an acceptable encryption key. Such acceptability may be based on the security and cryptographic considerations as to whether the encryption key (e.g., as shown from the key attributes associated with the encryption key) may be secure enough. In other words, the encryption key generated for a particular communication transaction may be presented for inspection by the policy to be evaluated as to whether the encryption key is to be allowed or denied for that communication transaction.

Some embodiments include an interface for applied key management for mobile communication devices (e.g., a wireless device, and/or the like), or provide an interface for applied key management for radio/satellite communications systems to include telemetry and payload in satellite communications. Particular implementations of the embodiments may include interfaces for banking applications such as, but not limited to, automated teller machines (ATMs), bank account interfaces, and the like. The interfaces for banking applications may be implemented on any mobile or non-mobile devices. Embodiments may provide an interface for applied key management for applications that include virtualization or providing an interface for applied key management for network infrastructure to include routers, switches, virtual private network (VPN¬) appliances, firewalls, intrusion detection systems (IDSs), intrusion prevention system (IPSs), tokenizers, and/or the like.

For example, a centralized encryption management may be provided for symmetric encryption keys or asymmetric encryption keys, in both private and/or public contexts. In some embodiments, existing network infrastructure information may be consumed to distribute encryption keys based on active/inactive status of network infrastructure or distributing and managing encryption keys for network infrastructure based on equipment that can readily accept encryption keys (e.g., existing hardware/software may be installed on the equipment for accepting encryption keys).

Embodiments may queue encryption key transaction information for communication devices not available at the point of a given encryption management operation (e.g., in a push-key event). In addition, embodiments described herein may centrally display encryption key lifecycle information (for supported infrastructure) and successful encryption key management transactions. In addition to or as an alternative, failure message and/or a cause of unsuccessful encryption key management transactions may be displayed.

In some embodiments, a service interface for a communication device to acquire new asymmetric keys on a timed basis may be provided. In addition, a service interface for a communication device to acquire new symmetric keys on a timed basis may be provided. In some embodiments, a service interface for a communication device to acquire new asymmetric keys on user initiated basis may be provided. In various embodiments, a service interface for a communication device to acquire new symmetric keys on a user initiated basis may be provided. Also, federated distribution of encryption keys based on established trust based key exchange between two or more key management and applied key management devices may be provided as described.

In some embodiments, distributing federated symmetric key to local enterprise infrastructure based on configurations for federated symmetric key distribution may be provided. In various embodiments, distributing federated asymmetric key to local enterprise infrastructure based on configurations for federated asymmetric key distribution may be provided. In addition, implementing federated trust model by using multiple devices and split key distribution may be provided to establish trust between two untrusted entities that need to communicate securely.

The applied key management device (e.g., the management request handler and associated components) may include sub-modules including a business logic module, authentication and authorization module, policy enforcement module, system consistency/validation module, and/or the like for performing functions described herein.

FIG. 1 is a schematic diagram of an example of a general encryption applied key management system 100 as implemented in various embodiments. In various embodiments, an applied key management device 110 may be coupled to at least one source device 150a and at least one target device 150b. The applied key management device 110 may comprise at least one desktop computer, mainframe computer, laptop computer, pad device, smart phone device or the like, configured with hardware and software to perform operations described herein. For example, the applied key management device 110 may comprise computation systems having suitable processing capabilities, memory, user interface (e.g., display and input) capabilities, and communication capabilities configured with suitable software to perform operations described herein. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the applied key management device 110 may relate to systems and processes that are implemented with dedicated device hardware/devices specifically configured for performing operations described herein.

Generally, the source device 150a may be a communication device transmitting data (or initiating communication) for which encryption (and therefore an encryption key) may be required or preferred. The target device 150b may be a communication device for receiving data that may have been encrypted (e.g., with an encryption key). According to various embodiments, the source device 150a and/or the target device 150b may be an ATM. The source device 150a and/or the target device 150b may also be any server or device for storing bank account information and executing banking functions. In particular embodiments, each of the source device 150a and the target device 150b may include a mobile smart phone (such as, but not limited to an iPhone™, an Android™ phone, or the like) or other wireless mobile communication devices with suitable processing and encryption capabilities. Typical modern mobile communication devices include telephone communication electronics as well as some processor electronics, one or more display devices and a keypad and/or other user input device. In further embodiments, each of the source device 150a and the target device 150b may comprise any suitable type of mobile phone and/or other type of portable electronic communication device, such as, but not limited to, an electronic smart pad device (such as, but not limited to an iPad™), a portable computer, or the like. It should be noted that an encryption key may originate from either the source device 150a or the target device 150b, and/or both. In other words, either of the source device 150a or the target device 150b may be a key source 170. The source device 150a and the target device 150b may be associated with a same enterprise or separate enterprises. In other embodiments, one or both of the source device 150a and the target device 150b may be a wired device suitable for communication with a wired or wireless device.

In some embodiments, the applied key management device 110 may be a part of the enterprise associated with the source device 150a and target device 150b. An enterprise may be an organization or security unit having dominance over at least one source device 150a and/or target device 150b. With respect to communication between the source device 150a and the target device 150b associated with disparate enterprises, the source device 150a may be associated with a first enterprise and the target device 150b may be associated with a second disparate enterprise. An enterprise may be a company, subgroup within a company, autonomous and independent entity, a communication group, security provider, various entities, organizations, and/or the like. Each applied key management device 110 may perform applied key management activities for a plurality of devices such as the source device 150*a* and the target devices 150*b*, establishing a hierarchical model for applied key management.

In other embodiments, the applied key management device 110 may be a third party server coupled to the enterprise associated with the source device 150*a* and/or target device 150*b*. Thus, various embodiments may affect centralization of encryption applied key management with existing communication systems and protocols of the enterprise. In other words, the applied key management device 110 may be implemented to cooperate with the existing encryption technology for communications, applications, and infrastructure. Applied key management (e.g., by a third party or otherwise) may interact with both the sources and targets of key information (e.g., the encryption key and the associated key attributes 160). Accordingly, a top-down control of applied key management may be achieved, while maintaining a request model in which the source device 150*a* and the target device 150*b* may request key information.

In some embodiments, a key source 170 may be coupled to the applied key management device 110. The key source 170 may be any source by which an encryption key (or any other types of security objects) may be generated. In some embodiments, the key source 170 may be a part of the applied key management device 110 (e.g., a module or database within the applied key management device 110 or coupled to the applied key management device 110). In other embodiments, the key source 170 may be a source external to the applied key management device 110. The key source 170 may include the source device 150*a* and/or the target device 150*b*, one or more of which may be capable of generating encryption keys for the communication therebetween. Alternatively or additionally, the key source 170 may be a key-generating device (other than the source device 150*a* and the target device 150*b*) internal or external to the same enterprise as the source device 150*a* and/or the target device 150*b*. In these cases, the key source 170 may be an existing specialized key generating device implemented separately from the applied key management device 110 (e.g., the key generation and management device 230 of FIG. 2). Other examples of the key source 170 may include a management user interface 220 of FIG. 2 (e.g., encryption keys may be generated manually through the management user interface 220), a key federation interface 260 of FIG. 2 (e.g., encryption keys generated from a disparate enterprise), various databases storing generated encryption keys, and/or the like.

In various embodiments, a request 175 may be sent to the applied key management device 110. The request 175 may be a request to generate an encryption key. For example, the applied key management device 110 may itself generate (or retrieve from a database coupled to the applied key management device 110) encryption keys in response to the request 175. In other examples, the applied key management device 110 may request an encryption key from other devices (e.g., the key source 170) within the same or a disparate enterprise.

The request 175 may originate from the source device 150*a*, the target device 150*b*, the applied key management device itself 110, a third-party device within the same enterprise (e.g., the management user interface 220, the key management interface 240, and the like), a third-party device in a disparate enterprise (e.g., from the key federation interface 260 of FIG. 2), and/or the like. Embodiments of the applied key management device 110 may therefore serve as an intermediary device between the source device 150*a*, the target device 150*b*, the requesting device (which issues the request 175), the key source 170, and/or the like. Accordingly, key management, distribution, and federation may effectively be managed for various devices in a same or disparate enterprise.

Various components within the general encryption applied key management system 100 (e.g., the applied key management device 110, the source device 150*a*, the target device 150*b*, the applied key management device itself 110, the device that issues the request 175, the key source 170, and/or the like) may be connected via any suitable wired or wireless network. The network may be secured or unsecured. For example, the network may be a wide area communication network, such as, but not limited to, the internet, or one or more intranets, local area networks (LANs), ethernet networks, metropolitan area networks (MANs), a wide area network (WAN), combinations thereof, or the like. In particular embodiments, the network may represent one or more secure networks configured with suitable security features, such as, but not limited to firewalls, encryption, or other software or hardware configurations that inhibits access to network communications by unauthorized personnel or entities.

In some embodiments, key attributes 160 may refer generally to characteristics associated with the encryption key itself, characteristics of a device associated with the encryption key, and/or the like. In other words, the key attributes 160 may refer to when, where, how, for what, with what device the encryption key has been or is about to be generated. Examples of the key attributes 160 may include, but not limited to, encryption key size, a classification of the encryption key, a time at which the encryption key has been or about to be generated (e.g., by the key source 170), a location in which the encryption key has been or about to be generated (e.g., by the key source 170), a role associated with the key source 170, a role associated with the source device 150*a*, a role associated with the target device 150*b*, a role associated with a key generating/storage device, a role associated with a user of the source device 150*a*, the target device 150*b*, the key generating/storage device, the source 170, a combination thereof, and/or the like.

In some embodiments, the key attributes 160 may include the key size. Typically, the larger the key size (i.e., the longer the encryption key), the more security it may provide for the communication. The key attributes 160 may also include the classification of the encryption key. In various embodiments, the classification of the encryption key may refer to its utilization e.g., what the encryption key may be used for. Examples of the utilization may include (e.g., for communication systems) whether an encryption key is a global hopping key, whether the encryption key is a secret key, whether the encryption key is symmetrical or asymmetrical, a combination thereof, and/or the like.

In some embodiments, the key attributes 160 may include a time and/or location at which the encryption key has been or about to be generated. As described, the time and/or location at which the encryption key may be generated may be defined from the perspective of the source device 150*a*, the target device 150*b*, and/or any other key sources 170. For example, when an encryption key is generated (and/or sent, received), a corresponding time of the device (e.g., the key sources 170) generating (and/or sending, receiving) the encryption key may be determined. The encryption key may be transmitted/stored with a time stamp representing the time. Similarly, when an encryption key is generated (and/or sent, received), a corresponding geo-location of the device (e.g., the key sources 170) generating (and/or sending, receiving) the encryption key may be determined. The encryption key may be transmitted/stored with the geo-location.

In various embodiments, the key attributes 160 may include role(s) associated the source device 150*a*, the target device 150*b*, the key source 170, the other key generating/storage device, as well as their associated user. Particularly, a role may refer to a group/classification (e.g., based on predefined assignment, time, geo-location of the device, whether the device is generating encryption keys, whether the device is transmitting the encryption key, whether the device is receiving the encryption keys, and/or the like) in which the device/user is assigned to, a level of security clearance, the type of the device/user, a combination thereof, and/or the like. In particular examples, each device/user may be associated with at least a security group (e.g., assigned to a server). Within each security group, subgroups may exist to further subdivide the devices/users. The groups/subgroups may be predetermined by any suitable personnel. In other or further embodiments, the groups/subgroups may be defined when the encryption key is generated (e.g., based on current characteristics of the device such as geo-location, time of the day, and/or the like).

It should be appreciated by one of ordinary skill in the art that one or more key attributes 160 may be associated with a given encryption key. In fact, as implemented in various embodiments, an encryption key may be associated with a plurality of key attributes 160. The encryption key may be transmitted along with the associated key attributes 160 to a device (e.g., the applied key management device 110). The encryption key and the key attributes 160 associated with the encryption key may be inspected according to at least one policy related to the key attributes 160. Such process may be referred to as "shooting" the key attributes 160 against the relevant policies or "presenting" the key attributes 160 for "inspection" by the policy.

The encryption keys may generally be managed by a set of policies 115. As implemented in various embodiments, a policy may refer to at least one defined rules governing the criteria for the key attributes 160. In some embodiments, a policy engine (e.g., as embedded in the applied key management device 110 and/or other devices as described herein) may receive the encryption key and the key attributes 160 associated with the encryption key as input. The policy engine may output a response as to whether the encryption key may be allowable based on the key attributes 160. In particular embodiments, the policy engine may output a binary response (e.g., accepted or denied).

The encryption key and the associated key attributes 160 may be presented for inspection one or more times per communication transaction. In some embodiments, the encryption key and the associated key attributes 160 may only be required to be presented for inspection by policy 115 once per communication transaction (e.g., at the initiation stage before the communication transaction has taken place but after the encryption key has been generated). In other or further embodiments, the encryption key and the associated key attributes 160 may be required to be presented for inspection by the policies 115 periodically and/or every time the encryption key has been altered for a given communication transaction. In some case several encryption keys may be presented for inspection by the policies 115 for a given communication transaction.

The policy engine may identify the key attributes 160 received. The policy engine may retrieve relevant policy 115 from a local or remote storage database. In other embodiments, the policy engine may inspect particular key attributes 160 (or sometimes all key attributes 160) associated with the encryption key as the policy engine determines acceptability based on the predefined set of policies 115. For example, the policy engine may determine, based on the relevant policy 115, whether the encryption key should be accepted for the communication transaction for which the encryption key may be generated.

In one non-limiting example, the policies 115 may dictate that a size of the encryption key must be within a predetermined range (e.g., the size of the encryption key must exceed and/or be below 128 bits, 192 bits, 256 bits, and/or the like). In some cases, the policy 115 may dictate that the size of the encryption keys must be a particular key size (e.g., 256-bit, and/or the like).

The policies 115 may require that the geo-location attribute of the key attributes 160 to be associated with (or not associated with) a predetermined location and/or within (or not within) a predetermined area. For example, when the geo-location attribute of the encryption key (e.g., as defined by the geo-location of the generating, transmitting, and/or receiving device of the encryption key) is associated with a "danger" zone, the policy engine may deny the encryption key. This is because there may be a high likelihood that the encryption key may be compromised in the danger zone. On the other hand, when the geo-location attribute of the encryption key is associated with a "safe" zone, then the encryption key may be allowed for the communication transaction. This is because there may be at most a low likelihood of comprised security keys. In further embodiments, a "neutral" zone may be a safe zone, or, in the alternative, a zone associated with an intermediate likelihood of comprised security keys.

In another non-limiting example, the policies 115 may require the time attribute of the key attributes 160 to be within (or not within) a predetermined time period. The policy 115 may deny the encryption key on the basis that the time attribute (e.g., a time stamp) associated with the creation, transmission, and/or reception of the encryption key may be outside of a predetermined time period (for example, at 3:00 am, where acceptable creation, transmission, and/or reception time of the encryption key may be between 9:00 am-5:00 pm).

In various embodiments, the policies 115 may allow the encryption key, when the role attribute of the key attributes 160 is associated with the encryption key generating/transmitting/receiving device (and the device's associated user) is within a predetermined accepted group. In some examples, the source device 150*a* (the target device 150*b* or other source devices 170) associated with a first security group within an enterprise may generate an encryption key and present the encryption key for inspection by the policy 115. The policy engine may determine whether the first security group may be a part of the accepted group. When the policy engine determined that the source device 150*a* (the target device 150*b* or other source devices 170) is a part of the accepted group (e.g., the first security group falls within the accepted group), the encryption key may be allowed for the communication transaction for which the encryption has been created for.

It should be appreciated by one of ordinary skill in the art that a plurality of policies 115 may act in concert for a comprehensive encryption key management scheme. This means that, the plurality of policies 115, each of which may regulate at least one disparate key attribute 160, may be aggregated into a set of policies 115 for regulating encryption keys presented to the policy engine.

In other examples, other key sources 170 (e.g., other than the source device 150a and the target device 150b) may generate an encryption key to be distributed (or pushed) to the source device 150a and/or the target device 150b for a communication transaction between those devices. The policy engine (e.g., the applied key management device 110) may inspect the key attributes 160 to determine whether the encryption key is allowable. In response to the encryption key being determined to be allowable, the applied key management device 110 may determine to distribute the encryption key to the source device 150a and/or the target device 150b for the communication transaction.

In various embodiments, when the policy engine denies the encryption key, the policy engine may transmit a rejection indicator (e.g., a "denied" message) to the key source 170. The key generating device may redesign a second encryption key to be presented (along with the key attributes 160 associated with the second encryption key) to the policy engine for a second round of inspection. In other embodiments, when the policy engine denies the encryption key, the policy engine may transmit a "denied" message to the key source 170 along with a cause of failure (e.g., a hint) as to which the key attribute 160 caused the denial and/or what it should be.

For example, an encryption key with key attributes 160 including a time attribute of 4:49 am, geo-location attribute of "safe zone," and role attribute of "security group A" may be presented to a set of policies 115. The policy engine may allow the encryption key when the encryption key is generated between 5:00 a.m.-9:00 p.m., in either a "safe zone" or a "neutral zone," and for security groups A-C. Such encryption key may be denied, given that it is not generated between 5:00 a.m.-9:00 p.m. The policy engine may transmit the "denied" message along with a time attribute hint (e.g., to generate the encryption key after 5:00 a.m., in 11 minutes).

Accordingly, the applied key management device 110 may be configured to manage encryption keys and distribute the encryption keys. In other words, the applied key management device 110 may serve as an intermediary between the source devices 150a, the target devices 150b, other key sources 170, and/or the like as these devices themselves may lack the capability to distribute and manage encryptions in the manner set forth with respect to the applied key management device 110. The applied key management device 110 may include a plurality of modules (or may be coupled to remote modules) for each feature as described herein. In addition, the general encryption applied key management system 100 may be coupled with at least one other similar general encryption applied key management system 100 to make up the encryption key federation scheme as described herein.

Figure 2:
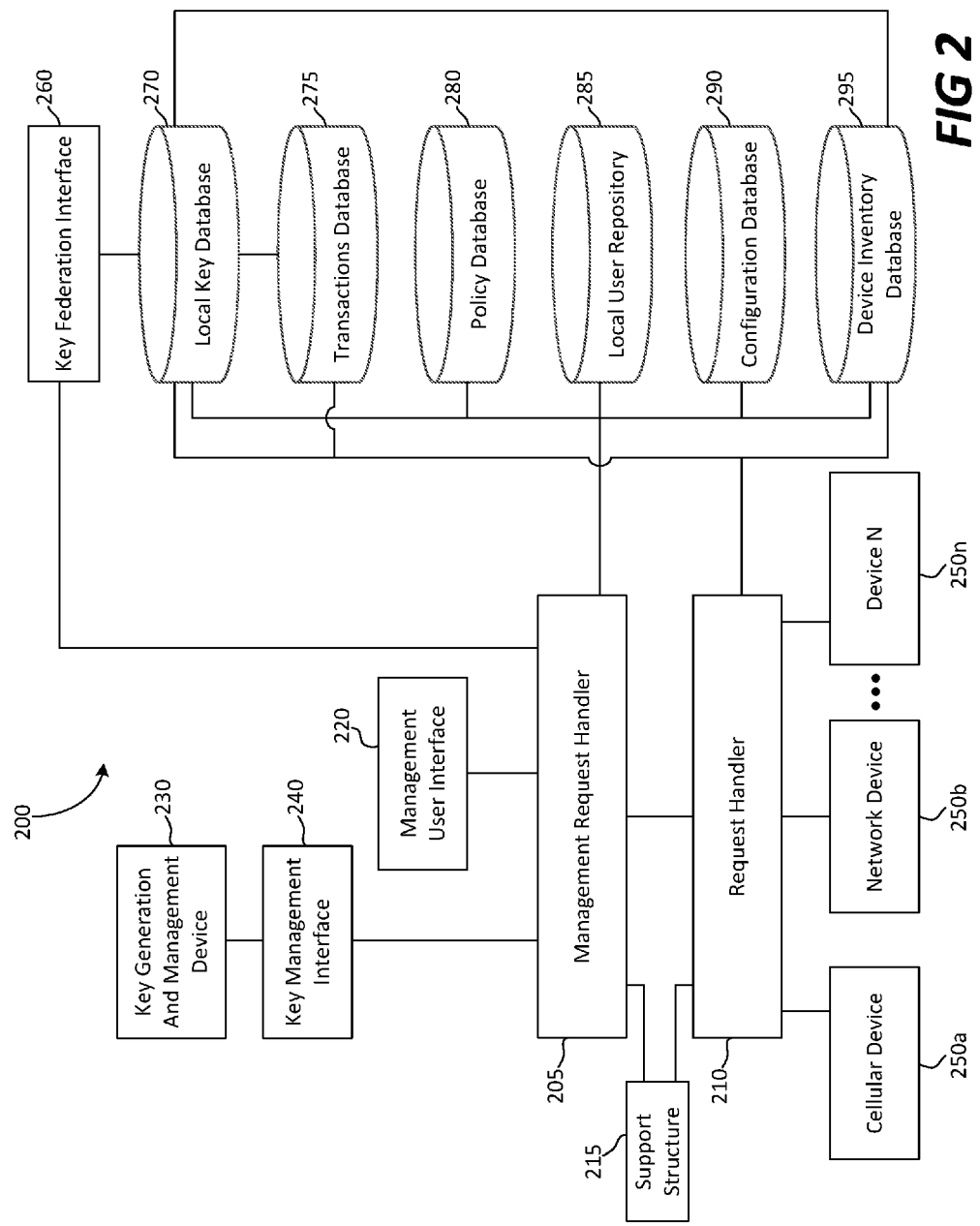
FIG. 2 is a schematic block diagram illustrating an example of an encryption applied key management system according to various embodiments.

FIG. 2 is schematic diagram illustrating an example of an encryption applied key management system 200 according to various embodiments. In some embodiments, the encryption applied key management system 200 may illustrate a particularized implementation of the general encryption applied key management system 100. From an architectural perspective, embodiments as illustrated for the encryption applied key management system 200 may be centered around message handling and interoperability with key generation technology, other applied key management devices, supported communications systems, applications, and infrastructure.

The applied key management device 110 may include at least a management request handler 205, a request handler 210, a support structure 215, a key federation interface 260, as well as the associated databases (e.g., a local key database 270, transactions database 275, policy database 280, local user repository 285, configuration database 290, device inventory database 295).

In various embodiments, the management request handler 205 may include (or is) the policy engine that may be implemented for policy-based encryption key management, distribution, and federation. As the management request handler 205 can be an intermediary layer between the various components described, rapid integration of the policy-based encryption key management, distribution, and federation may be added to an existing system without having to make changes to the system level message handling. The management request handler 205 may provide a top-down management for various communication devices (e.g., a cellular device 250a, a network device 250b, . . . , a device N 250n, and/or the like) associated with a given enterprise. In various embodiments, each of the cellular device 250a, the network device 250b, . . . , and the device N 250n may be the source device 150a or the target device 150b depending on the particular communication transaction for which the encryption key is generated.

The management request handler 205 and the request handler 210 may be of an agent-interface relationship. That is, the request handler 210 may serve as the interface between the management request handler 205 and the various communication devices associated with the enterprise (e.g., the cellular device 250a, the network device 250b, . . . , the device N 250n, and/or the like). The communication between the management request handler 205 and the request handler 210 may be facilitated by the support structure 215. The support structure 215 may provide suitable communication protocol, management application, infrastructure, communication application program interface (API), configurations, translations, and/or the like for interfacing between the management request handler 205 and the request handler 210.

The request handler 210 may receive key generating requests 175 and/or encryption keys from the various communication devices and relate them to the management request handler 205 with the assistance from the support structure 215. The request handler 210 may also relate the response of the management request handler 205 (including the hint in some embodiments) and/or encryption keys to the various communication devices with the assistance from the support structure 215.

In various embodiments, the management request handler 205 may receive the request 175 for generating an encryption key. Various components may be capable of transmitting the request 175 to the management request handler 205. The some embodiments, the management request handler 205 may receive the request 175 from the various communication devices associated with the enterprise (e.g., the cellular device 250a, network device 250b, . . . , device N 250n, and/or the like). The request 175 may be related by the request handler 210, which may serve as the interface between the devices and the management request handler as described. The key federation interface 260, the management user interface 220, and the key management interface 240 may also transmit the request 175 to the management request handler.

In non-request-driven embodiments, the management request handler 205 may receive encryption keys from at least one key source 170. The key source 170 may be the key generation and management device 230, which may be any suitable existing encryption key generating apparatus implemented within the enterprise. In other words, the key generation and management device 230 may represent any existing schemes internal or external to the communication systems of the enterprise. For example, the key generation and management device 230 may be any suitable native protocol associated with safe net equipment.

Embodiments of the key management interface 240 may represent an internal integration of key generation and key management capabilities as well as an external interface with existing solutions. This is because the key management interface 240 may be poised between the key generation and management device 230 (which may generate encryption keys) and the management request handler 205 (which inspects key attributes 160 of the encryption keys based on policies 115). For example, the key management interface 240 may be a translation interface that maintains a standard encryption management messaging language with the applied key management device 110. This can allow enterprise interoperability between existing solutions (e.g., the key generation and management device 230) and the applied key management platform (e.g., the management request handler 205). Accordingly, the policy-based encryption applied key management systems and methods may be implemented with various types of security object (e.g., encryption key) generation protocols.

Additionally or alternatively, in request-driven embodiments, the management user interface 220 may transmit the request 175 to the management request handler 210. The management user interface 220 may utilize the same API as other components described herein to assure interoperability. The management user interface 220 may include suitable user input and display devices to receive and display data to a designated managing user. In particular embodiments, the management user interface 220 may include a mobile device such as a smartphone or a tablet. The management user interface 220 may also include a wired device.

In some embodiments, the key federation interface 260 may transmit the request 175 to the management request handler 205. The key federation interface 260 may be in communication with a second key federation interface (such as, but not limited to, the key federation interface 260) associated with a disparate enterprise (which may utilize the same or similar applied key management systems and methods described). When one of the various communication devices (e.g., the cellular device 250*a*, network device 250*b*, . . . , device N 250*n*, and/or the like) wishes communicate with another device from the disparate enterprise (or vice versa), the request 175 may be transmitted (from the key federation interface 260 of the second enterprise) to the key federation interface 260 of the current enterprise. In some embodiments, the request 175 may be directly transmitted to the management request handler 205 when the key federation interface 260 has designated the relationship between the enterprises to be trusted.

In some embodiments, instead of or in addition to the request 175, encryption keys as well as the "allowed" and "denied" messages may be transmitted and received between the key federation interface 260 (of the current and the second enterprise). The encryption key and its associated attributes 160 may be stored in the local key database 270, which may be accessible by the management request handler 205 (for policy inspection) and/or the request handler 210 (for distribution).

The request 175 may be transmitted with further instructions related to generating the encryption key. The further instructions include, but are not limited to, a source of encryption keys, the encryption keys themselves, key attributes 160 associated with the encryption keys, and/or the like.

In various embodiments, in response to receiving the request 175, the management request handler 205 may generate or facilitate the generation of the encryption key. For example, where the request 175 may be silent as to where the encryption key is to be generated (e.g., the key source 170), the management request handler 205 itself may generate the encryption key. The management request handler 205 may generate the encryption key based on the set of policies 115 stored in the policy database 280. In other words, the management request handler 205 may generate the encryption keys with key attributes 160 that would not have violated any policies 115 set forth in the policy database 280.

Where the request 175 may be silent as to where the encryption key is to be generated (e.g., the key source 170), or specifies that a particular key source 170 to generate the encryption key, the management request handler 205 may retrieve or otherwise request the encryption key from a suitable key source 170. The management request handler 205 may request encryption keys from the management user interface 220, the key federation interface 260, the communication devices (e.g., the cellular device 250*a*, network device 250*b*, . . . , device N 250*n*, source device 150*a*, and target device 150*b*), key management interface 240, and/or the like.

The management request handler 205 may retrieve encryption keys from a designated database storing encryption keys (e.g., the local key database 270). The local key database 270 may be coupled to other key sources 170 (e.g., the cellular device 250*a*, network device 250*b*, . . . , device N 250*n*, source device 150*a*, target device 150*b*, the key generation and management device 230 the key federation interface 260, and/or the like) and store cached encryption keys on behalf of the other key sources 170. The management request handler 205 may retrieve encryption keys from the local key database 270 instead of requesting encryption keys from the key sources 170. This is so that transaction time for retrieving/generating the encryption key may be improved, and that network problems would not hinder the ability of the management request handler 205 to obtain encryption keys, given that the local key database may be local to (e.g., residing on a same network node) the management request handler 205. As the management request handler 205 is retrieving encryption keys from the local key database 270, a verification request may be sent to the key source 170 to ensure whether the encryption key to be retrieved has been altered by the key source 170. A confirmation or an updated encryption key may be sent to the local key database 270 in response, so that the management request handler 205 may accordingly receive the encryption key.

In some embodiments, the management request handler 205, upon receiving encryption keys (whether requested or not) in any manner as described, may cache the encryption key along with the key source identifier and the associated key attributes 160 at the local key database 270. The encryption key, the key source identifier, and the key attributes 160 may be stored in case that the communication is lost or when the encryption key source of the encryption key is not authoritative. Whereas in some embodiments, the encryption key may not be transmitted with the key attributes 160. In such embodiments, the management request handler 205 may determine the key attributes 160 from various sources such as, but not limited to, the local user repository 285, the device inventory database 295, and/or the like.

The management request handler 205 may then inspect the key attributes 160 associated with the encryption key received based on the set of policies 115 stored in the policy database 280. The management request handler 205 may retrieve all policies 115 or only the relevant policies (e.g., based on some or all key attributes 160) from the policy database 280. In some embodiments, the encryption keys generated by the management request handler 205 or at the direction of the management request handler 205 may be spared from inspection by policies 115 when they are created based on the policies 115. In other embodiments, all encryption keys generated by the management request handler 205 or at the direction of the management request handler 205 may be inspected by the policies 115. Encryption keys allowable based on the policies 115 may be allowed while unacceptable encryption keys may be denied, in the manner described. The management request handler 205 may be configured to update or add policies stored in the policy database 280 (e.g., as directed by the management user interface 220).

The local user repository 285 may be a database storing information related to local users of the communication devices (e.g., the cellular device 250*a*, network device 250*b*, device N 250*n*, and/or the like) within the enterprise. In various embodiments, the local user repository 285 may store characteristics/information of the users that would constitute key attributes 160. The characteristics include, but not limited to, privileges, security groups, assigned roles, a combination thereof, and/or the like. The security groups may be stored in a hierarchical tree. The management request handler 205 may access the local user repository 285 for such characteristics and utilize them as key attributes 160 associated with encryption keys requested, transmitted, or received by that device corresponding to such characteristics. The management request handler 205 may add or alter information stored in the local user repository 285. A copy of the information stored in the local user repository 285 may be sent to the local key database 270 as key attributes 160 to be stored in the local key database 270.

In some embodiments, the transaction database 275 may store various communication transactions or potential communication transactions. In some embodiments, the transaction database 275 may store encryption key transmission instances (i.e., instances where encryption keys are to be distributed) to one or more devices. For example, when a particular encryption key cannot/should not be forwarded (e.g., pushed to a communication device) for any reason, the forwarding transaction (e.g., a job) may be queued or otherwise stored within the transactions database 275 for forwarding the encryption key at a later some. The transaction database 275 may also store a status of each particular encryption key transmission instance, which may later be read by the request handler 210. For example, the request handler 210 may at a later time attempt to transmit all or some encryption keys to corresponding communication devices for all "unsent" encryption key transmission instances. The transactions database 275 may be coupled to the local key database 270 to gain access of the keys to be forwarded to each communication device that the encryption key may be generated for.

In further embodiments, the transaction database 275 may be coupled to the request handler 210 and may store the communication transactions (for which the encryption key may be requested, transmitted, or received) and/or the associated key attributes 160. For example, the request handler 210 may transmit such information to the transactions database 275. The transaction database 275 may be coupled to the local key database 270. The communication transactions (as the associated details) may be associated with the encryption keys stored in the local key database 270. The management request handler 205 may need to access only the local key database 270 for the encryption keys and the associated key attributes 260.

The configuration database 290 may store supporting instructions for the key encryption applied key management system 200. In some embodiments, the configuration database 290 may store internal network, configuration of clients, configuration of applications, IP address allocations, various component configurations, device privileges, device communication pathways, credentials, and/or the like. The configuration database 290 may be coupled to the management request handler 205, which may require the instructions stored within the configuration database 290 for operations. The management request handler 205 may also add or alter the information stored in the configuration database 290.

In some embodiments, the device inventory database 295 may store information related to the communication devices associated with the given enterprise. For example, information stored may include, but not limited to, security group, security level, geo-location, identification number, internal classification, device specifications, time stamp in which an encryption has been created, a combination thereof, and/or the like. The request handler 210 may be coupled to the device inventory database 295 to store such data therein. The management request handler 205 may be coupled to the device inventory database 295 for accessing such device information. The device inventory database 295 for associating particular cached keys with the corresponding device information as key attributes 160. A copy of the information stored in the device inventory database 295 may be sent to the local key database 270 as key attributes 160.

The key federation interface 260 may allow one applied key management device 110 to federate encryption key information with one or more other applied key management devices 110 (through their associated respective key federation interfaces 260) based on an established trust relationship. Each enterprise may include by an applied key management device 110. As such, the key federation interface 260 may maintain a trust relationship with the communication systems of at least one other enterprise. It is, in other words, a gateway to extend trust.

Figure 3:
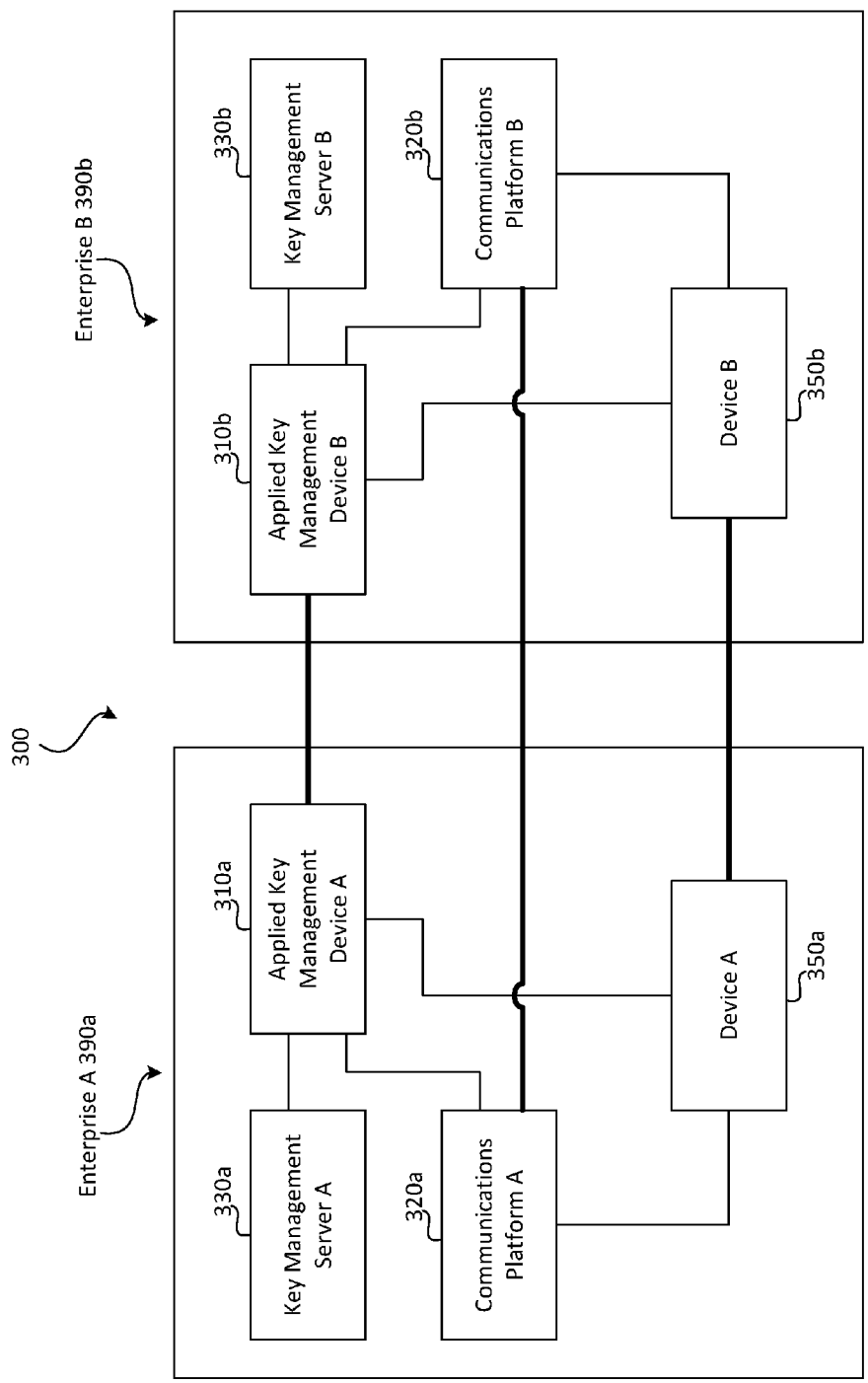
FIG. 3 is a schematic block diagram illustrating an example of an encryption key federation system as implemented in various embodiments.

FIG. 3 illustrates an example of an encryption key federation system 300 as implemented in various embodiments. The key federation system 300 may implement the applied key management device 110 as set forth with respect to FIGS. 1-2. The key federation system 300 may be based on extra-enterprise communication relationship and key federation enabled by the applied key management device 110 (e.g., the management request handler 205 and the associated components).

Encryption keys (e.g., asymmetric encryption keys, symmetric encryption keys, and/or the like) generated by components within one enterprise (e.g., enterprise A 390*a*) may be distributed to a disparate applied key management device (e.g., the applied key management device 110, the management request handler 205, and its associated components, and/or the like) of another enterprise (e.g., enterprise B 390*b*) pursuant to inspection by the policies 115 of either (or both) enterprises. This can enable secured communications or data exchange with outside entities (e.g., enterprises)

based on the federated trust model. This can also allow encryption management to parallel communications management in supporting external communications to enable symmetric key encryption for communications. Accordingly, performance of the communications platform may be improved, given that utilization of asymmetric encryption may be expensive from a processing perspective as compared to symmetric encryption.

In the key federation system 300, each enterprise (e.g., the enterprise A 390*a* or the enterprise B 390*b*) may be associated with a respective one of an applied key management device A 310*a* and an applied key management device B 310*b*). Each of the applied key management device A 310*a* and the applied key management device B 310*b* may be the applied key management device 110. The applied key management device A 310*a* and the applied key management device B 310*b* may be in communication with one another through any suitable network. In particular, the key federation interfaces (e.g., the key federation interface 260) of each of the applied key management device A 310*a* and the applied key management device B 310*b* may be in communication with one another.

In various embodiments, the key management server A 330*a* and the key management server B 330*b* may be a device such as, but not limited to, the key generation and management device 230 and the key management interface 240. Each of the key management server A 330*a* and the key management server B 330*b* may be coupled to their respective key federation interfaces 206 within their respective enterprises in the manner described.

A device A 350*a* and a device B 350*b* may attempt to obtain an encryption key for the communication therebetween. Each of the device A 350*a* and the device B 350*b* may be the source device 150*a*, the target device 150*b*, the cellular device 250*a*, the network device 250*b*, . . . , the device N 250*n*, a combination thereof, and/or the like.

An encryption key may be generated within one enterprise (e.g., enterprise A 390*a*) from any suitable key source 170 in the manner described. The encryption key may be generated by the enterprise A 390*a* (e.g., by a key source 170 in the enterprise A 390*a*) with or without a request 170 from either enterprise B 390*b* or within enterprise A. The encryption key may likewise be generated by the enterprise B 390*b* in a similar manner. The encryption key and its associated key attributes 160 may be presented to the policy engine of enterprise A 390*a* (e.g., the applied key management device A 310*a*, which may include the management request handler 205 and its associated components) for inspection in the manner described. In response to the policy engine of enterprise A 390*a* determining the encryption key is accepted based on the encryption key attributes 160, the applied key management device 310*a* (e.g., the key federation interface 260) of enterprise A 390*a* may relate the encryption key as well as its associated key attributes 160 to the applied key management device B 310*b* (e.g., the key federation interface 260) of enterprise B 390*b*.

Upon receiving the encryption key and its associated key attributes 160, the encryption key and its associated key attributes 160 may be presented to the policy engine of enterprise B390*b* (e.g., the applied key management device B 310*b*, which may also include the management request handler 205 and its associated components) for inspection in the manner described. The encryption key may be forwarded to both the device A 350*a* and the device B 350*b* when the applied key management device B 310*b* determines that the encryption key is consistent with its policies 115 defined for enterprise B 390*b*. In other words, the encryption key (as defined by its key attributes 160) may be allowed only if it is consistent with both sets of policies 115 of enterprise A 390*a* as well as enterprise B 390*b*. At least some of the set of policies 115 of enterprise A 390*a* may be different from at least some of the set of policies 115 of enterprise B 390*b*. Whereas the encryption key is found not allowable by either the applied key management device A 310*a* or the applied key management device b 310*b*, the encryption key may be returned back to the key source 170 with the "denied" message and/or the hint in the manner described.

In other embodiments, acceptance by policies 115 associated with only one enterprise (e.g., either enterprise A 390*a* or enterprise B 390*b*) may be sufficient for encryption key to be allowed. In such cases, the trust extends to some or sometimes all of the policies 115. In addition, each enterprise may include a set of policies 115 for the federated instances (e.g., each enterprise may have agreed with the other regarding a set of policies 115 used when communications between the communication devices of the enterprises are to occur. Accordingly, each enterprise may store (e.g., in each respective policy database 280) a same set of federated (mutual and reciprocal) policies for the federated schemes. The federated policies may be the same for both the enterprise A 390*a* and the enterprise B 390*b*. Thus, allowance by one applied key management device associated with one enterprise may be sufficient for the encryption key to be forwarded for usage for communication between both enterprises.

In various embodiments, enterprise federation policies may be stored within each policy database 280. The enterprise federation policies may specify the manner in which the encryption keys may be federated. For example, the enterprise federation policies may specify the federated policies, which applied key management device may inspect the key attributes 160, which enterprise may issue a request 175 for an encryption key, which enterprise may generate an encryption key, a combination thereof, and/or the like. The enterprise federation policies allow flexibility in policy defining. For example, the enterprise federation policies may specify that enterprises may each include its own policies 115 in addition to the federated policies, where at least a part the policies 115 of each enterprise may be disparate.

In some embodiments, a communication platform A 320*a* and a communication platform B 320*b* of each respective enterprise may be in communication with one another via any suitable network. Such communication between the communication platforms may be encrypted communications, where the encryption key corresponding to such communication may also be presented for inspection by policies 115 similar to described with respect to the devices (e.g., the device A 350*a*, the device B 350*b*, and/or the like). Each communication platform may be in communication to a respective device, such that configurations related to the applied key management systems may be exchanged.

Figure 4:
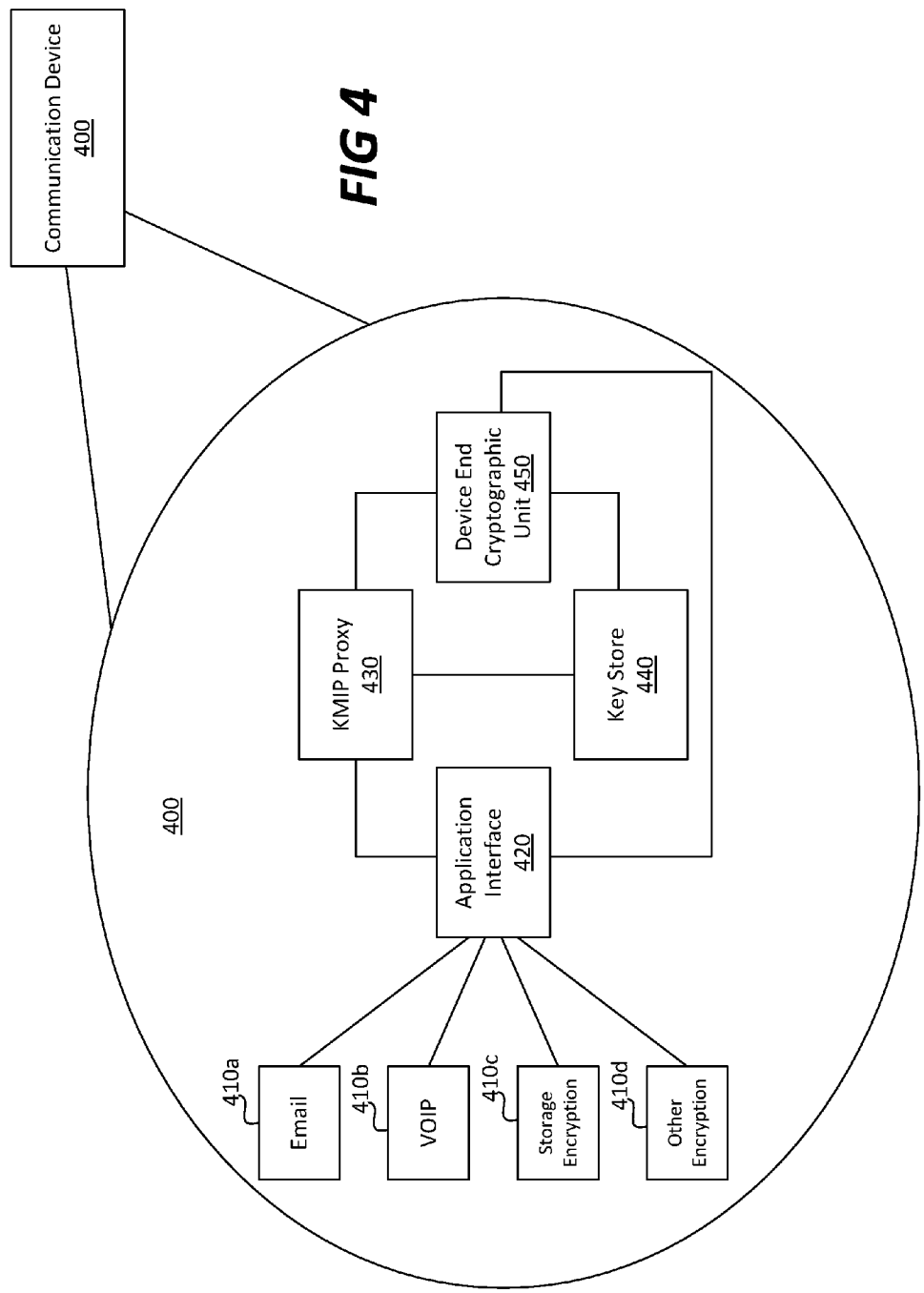
FIG. 4 is a schematic block diagram illustrating an example of a communication device consuming applied key management services according to some embodiments.

FIG. 4 illustrates an example of a communication device 400 consuming applied key management services as part of the enterprise according to some embodiments. Referring to FIGS. 1-4, the communication device 400 may be a device such as, but not limited to, the source device 150*a*, the target device 150*b*, the cellular device 250*a*, the network device 250*b*, . . . , the device N 250*n*, the device A 350*a*, the device B 350*b*, a combination thereof, and/or the like. In some embodiments, the communication device 400 leverages applied key management to receive encryption keys (or key updates) associated with applications such as, but not limited to, an Email application 410*a*, voice-over-internet protocol (VOIP) application 410b, storage encryption 410c, and/or other encryption applications 410d on the communication device 400.

The communication device 400 may be registered with an applied key management platform to receive applied key management services. The communication device 400 may provide an application interface 420 based configured to receive with encryption key distribution and encryption key management messages (e.g., the "allowed" message, the "denied" message, the hint, and/or the like) from the applied key management device 110. The application interface 420 may be coupled to each of the Email application 410a, voice-over-internet protocol (VOIP) application 410b, storage encryption 410c, and/or other encryption applications 410d to forward the accepted encryption key to them.

This communication device 400 may also utilize KMIP by a KMIP proxy 430 to receive KMIP type commands from the applied key management device 110. The KMIP proxy 430 may be connected to the key store 440 for managing the encryption keys stored therein. The KMIP proxy 430 may also be connected to a device-end cryptographic unit 450. The device-end cryptographic unit 450 may be configured to generate encryption keys. In response to the "denied" message, the device-end cryptographic unit 450 may generated a different encryption key to present to the policy engine for inspection. Whereas the hint is given, the device-end cryptographic unit 450 may generate a different encryption key based on the hint. The device-end cryptographic unit 450 may cache its encryption keys in the key store 440. The device-end cryptographic unit 450 may be coupled to the application interface 420. The application interface 420 may transmit the encryption keys generated along with the key attributes 160 to the policy engine and forward the response of the policy engine to the device-end cryptographic unit 450 e.g., when the response is negative.

Accordingly, operation-level policy inspection may be achieved. Given that the communication device 400 may be capable to interact with the policy engine regarding the encryption keys, the ability to service the request for an encryption key (or inspect the encryption key) by a third-party device (e.g., the policy engine residing in the applied key management device 110) acting as administrating may be achieved. The request 175 for an encryption key or the encryption key may be serviced each communication transaction.

Figure 5:
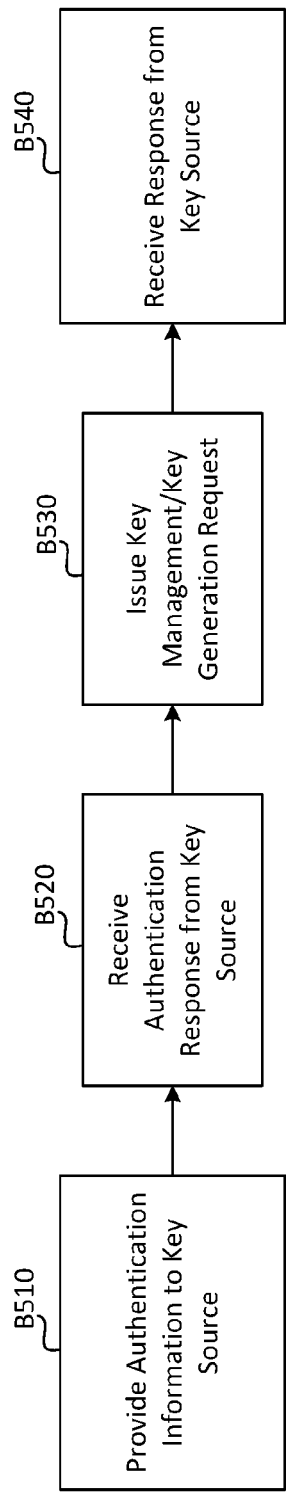
FIG. 5 is a process flow diagram illustrating an example of a request authentication process for issuing requests and receiving encryption keys according to some embodiments.

FIG. 5 illustrates an example of a request authentication process 500 for issuing requests 175 for encryption keys in various encryption applied key management systems according to some embodiments. The request authentication process 500 may be internal to the applied key management device 110, when the applied key management device 110 (e.g., the management request handler 205, the applied key management device A 310a, the applied key management device B 310b, and/or the like) itself generates the encryption keys. In other embodiments, the request authentication process 500 may be external to the applied key management device 110 to support integration with existing key management and key generation infrastructure (e.g., the key generation and management device 230, the key management server A 330a, the key management server B 330b, and/or the like).

First, at block B510, the applied key management device 110 may provide authentication information to a key source 170. As described, such key source 170 may be the applied key management device 110 itself, the key generation and management device 230, the management user interface 220, the key federation interface 260, the communication devices (e.g., the cellular device 250a, network device 250b, ..., device N 250n, source device 150a, target device 150b, device A 350a, device B 350b, communication device 400, a combination thereof, and/or the like), and/or other external key sources. The authentication information may be any suitable authentication method, such as username/passcode request, security handshake algorithms, biometric request, a combination thereof, and/or the like.

Next, at block B520, the applied key management device 110 may receive authentication response from the key source 170. The applied key management device 110 may authenticate the response and establish trusted relationship between the key source 170 and the applied key management device 110. Next at block B530, the applied key management device 110, the management user interface 220, the key generation and management device 230, the communication devices, and other API calls may issue a key management/generation request (e.g., the request 175) to the key source 170. In some embodiments, the applied key management device 110 may forward the request 175 from a trusted third party (e.g., the communication devices, the management user interface 220, the key federation interface 260, and/or other third-party devices) to the key source 170. In some embodiments, the request 175 may be directly sent to the key source 170. The applied key management device 110 may be configured to determine whether to generate encryption keys itself or forward the request to another key source 170 when the request 175 does not identify the key source 170. Next, at block B540, the applied key management device 110 may receive response (e.g., the encryption keys as requested) from the key source 170.

Subsequently, the encryption keys obtained by the applied key management device 110 may be evaluated based on the key attributes 160 and the policies 115 in the manner described. When allowed, the encryption keys may be distributed to the communication devices associated with the corresponding communication transaction. When denied, the applied key management device 110 may transmit the "denied" message (and in some instances, the hint) and standby for new encryption keys.

In some embodiments, multiple requests may be sent to a plurality of key sources 170, each request may correspond to a single communication transaction. In response, the multiple responses (e.g., encryption keys) may be received from the key sources 170. In other embodiments, multiple requests may be sent to a plurality of key sources 170, where two or more requests may correspond to a same communication transaction. As the applied key management device 110 may receive two or more encryption keys from the key sources 170. The applied key management device 110 may determine one of the two or more encryption keys for the communication transaction based on the policies 115 (e.g., the most secure out of the two or more encryption keys).

Accordingly, large scale distribution by the applied key management device 110 may be possible in systems including at least one source for the encryption keys and multiple recipient communication devices.

Figure 6:
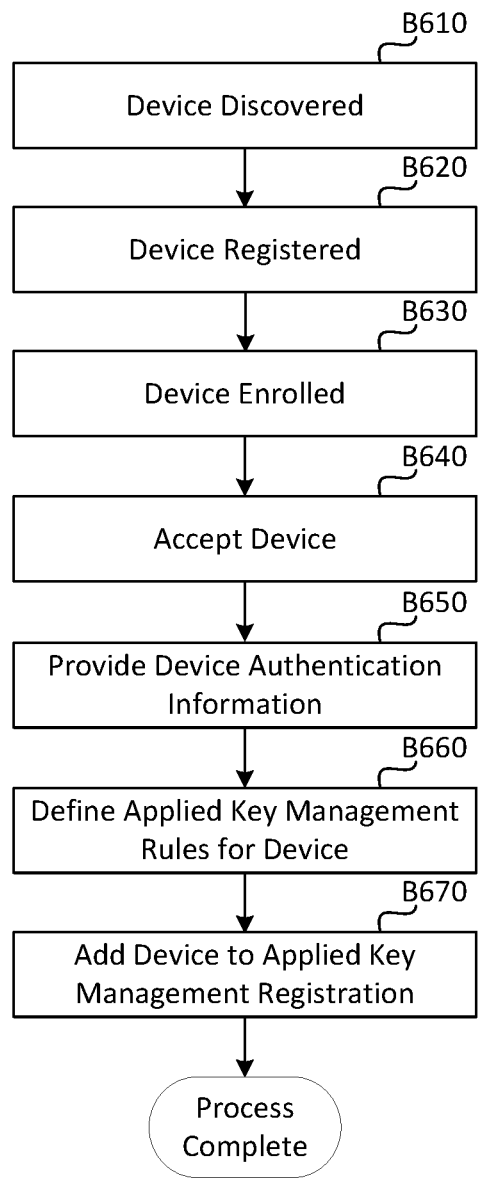
FIG. 6 is a process flow diagram illustrating an example of a communication device registration process implemented in various applied key management systems according to various embodiments.

FIG. 6 is a process flow diagram illustrating an example of a communication device registration process 600 implemented in various applied key management systems according to various embodiments. Blocks B610, B620, B630 may be executed simultaneously or sequentially in that order. First, at block B610 the communication device may be discovered (e.g., by the request handler 210). The request handler 210 may detect that the communication device is present within the enterprise (e.g., the networks associated with the enterprise) automatically.

At block B620, the communication device may be registered (e.g., by the request handler 210). In some embodiments, configuration information related to the applied key management systems may be transmitted to the communication device. Device information of the communication device may be transmitted to the local user repository 285, device inventory database 295, and/or the like. At block B630, the communication device may be enrolled (e.g., by the request handler 210). For example, the communication device may transmit a server authentication request the request handler 210 and receiving a positive authorization response.

Next, at block B640, the communication device may be accepted (e.g., by the request handler 210). For example, the request handler 210 and/or the management request handler 205 may check existing policies 115 based on the device information to determine whether the communication device has been classified in the appropriate group, whether the applied key management device 110 may be capable of managing the communication device, a combination thereof, and/or the like.

Next, at block B650, the request handler 210 may provide device authentication information to the communication device. The authentication information may include configurations (e.g., credentials, passcodes, and/or the like) to access the applied key management device 110. Next, at block B660, the request handler 210 and/or the management request handler 205 may define applied key management rules for the communication device. Following block B660 at block B670 a corresponding identifier, the commination device has been added to an applied key management registration. Subsequently, the communication device may request for encryption keys, generate encryption keys, receive approved encryption keys, and/or the like in the manner described. Such process ensures that the communication device utilizing services provided by the applied key management device 110 may meet the operable standards of the applied key management device 110.

Figure 7:
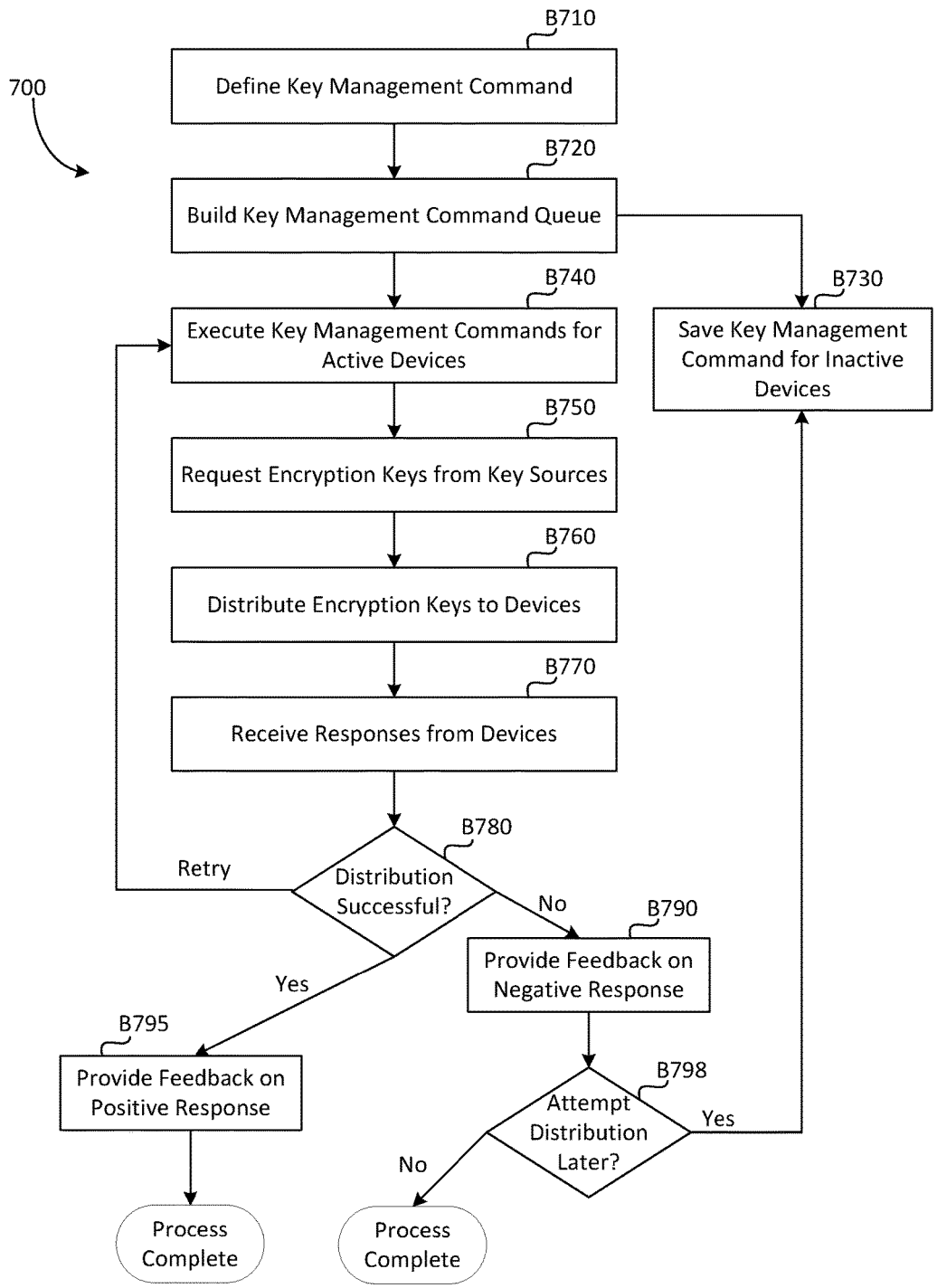
FIG. 7 is a process flow diagram illustrating an example of a key management and distribution process according to various embodiments.

FIG. 7 illustrates an example of a key management and distribution process 700 according to various embodiments. Referring to FIGS. 1-7, the key management and distribution process 700 may be implemented with communication devices registered, discovered, and/or enrolled with the applied key management device 110.

First, at block B710, the management request handler 205 may define key management command. A key management command may be a particularized command for a key management event (e.g., "job"). The key management event may be an event triggering a set of algorithms to create encryption keys based on the policies 115 and distribute (e.g., push) the encryption keys to at least one of the communication devices (e.g., the cellular device 250a, network device 250b, . . . , device N 250n, source device 150a, target device 150b, device A 350a, device B 350b, communication device 400, a combination thereof, and/or the like).

In some embodiments, the key management event may be based on time. For example, the management request handler 205 may be configured to rekey for at least some (sometimes all) of the communication devices associated with the enterprise (or another enterprise) periodically (e.g., every day, every week, every month, and/or the like). In various embodiments, the key management event may occur automatically through an API call. The API call may be issued from any components internal and/or external to the applied key management device 110 within a same or disparate enterprise.

The key management event may also be user-defined. For example, the management user interface 220 may receive user input from the designated user to generate encryption keys immediately for at least one communication device. In such examples, such user-defined key management events may be initiated in response to a sudden event, including cyber-attacks, security breaches, change to the polices 115, and/or the like. The management user interface 220 may also alter the policies 115 stored within the policy database 280 in response to these key management events. The new encryption keys created must follow the altered set of policies 115.

The key management command may include providing encryption key to some or all communication devices within the same or a disparate enterprise, re-transmitting a same or different encryption key to some or all communication devices within the same or disparate enterprise, a combination thereof, and/or the like. In various embodiments, the management request handler 205 may define for a plurality of key management commands, each of which may correspond to a communication transaction and/or communication device associated with the enterprise. In further embodiments, the management request handler 205 may define key management commands for communication devices associated with a disparate enterprise when allowed by the federation model. The management commands (e.g., encryption keys) may be transmitted via the key federation interfaces 260 associated with each enterprise.

Next, at block B720, the management request handler 205 may build a key management command queue. A job created in response to the key management event may include a plurality of key management commands, each of which may correspond to a communication device and/or a communication transaction. Accordingly, where the key management commands are generating new encryption keys and distributing to two or more communication devices, the key management commands may be queued (e.g., stored within the transactions database 275) for execution, given the volume of the key management commands. As such, a composite command may correspond to key management commands for multiple key sources to issue encryption keys to multiple encryption key receiving communication devices. The composite command may be associated with a plurality of key management commands, and may be stored as a whole in the transaction database 275 awaiting distribution. Thus, even if a server (e.g., the management request handler 205) is shut off before all the key management commands are executed/distributed, the process may resume as soon as the sever is switched on.

Key management command associated with inactive communication devices (e.g., communication devices that may be turned off and/or off the network) may be stored in the transactions database 275 for future distribution (e.g., when the inactive communication devices are switched on) by the management request handler 205 at block B730. On the other hand, for active devices (e.g., communication devices that may be turned on and/or on the network), the key management command may be executed by the management request handler 205 at block B740.

For example, the management request handler 205 may request encryption keys from key sources 170 based on the key management commands at block B750. For example, the key management commands may specify one or more key sources 170 to issue encryption keys to the communication devices. Accordingly, some communication devices may receive encryption keys from a first key source while other communication devise may receive encryption keys from a second different key source. Next, at block B760, the management request handler 205 may distribute encryption keys to the communication devices. In some embodiments, the management request handler 205 may perform encryption key inspection based on the key attributes 160 and the set of policies 115 in the manner described. Once approved, the management request handler 205 may forward the encryption keys to the corresponding communication devices through the request handler 210.

Next, at block B770, the management request handler 205 may receive response to the distribution from the communication devices. For example, the management request handler 205 may determine, based on the responses of the communication devices, whether such distribution was successful at block B780. Whereas the management request handler 205 determines that the distribution was successful with respect to a given communication device (e.g., that communication device has received the encryption key distributed to it), positive feedback may be provided to the management request handler 205 at block B795.

On the other hand, whereas the management request handler 205 determines that the distribution was unsuccessful (e.g., that communication device has not received the encryption key distributed to it) for a given communication device, a negative response of that communication device may be provided to the management request handler 205 at block B790. The management request handler 205 may then determine whether to attempt to execute the key management command again at a later time for that communication device based on preexisting algorithms or user input at block B798.

When management request handler 205 determines that execution of the key management commands (e.g., the distribution of the encryption) is not to be attempted again (B798: NO), the process ends. On the other hand, whereas the management request handler 205 determines that key management commands not successfully distributed are to be attempted again (B798: YES), the key management commands may be stored at block B730 (e.g., in the transactions database 275) for future distribution.

In some embodiments, when distribution of the key management commands may be unsuccessful, the management request handler 205 may determine to retry distribution of the unsuccessful key management commands (B780: RETRY). For example, the management request handler 205 may again execute key management commands for active devices at block B740.

Figure 8:
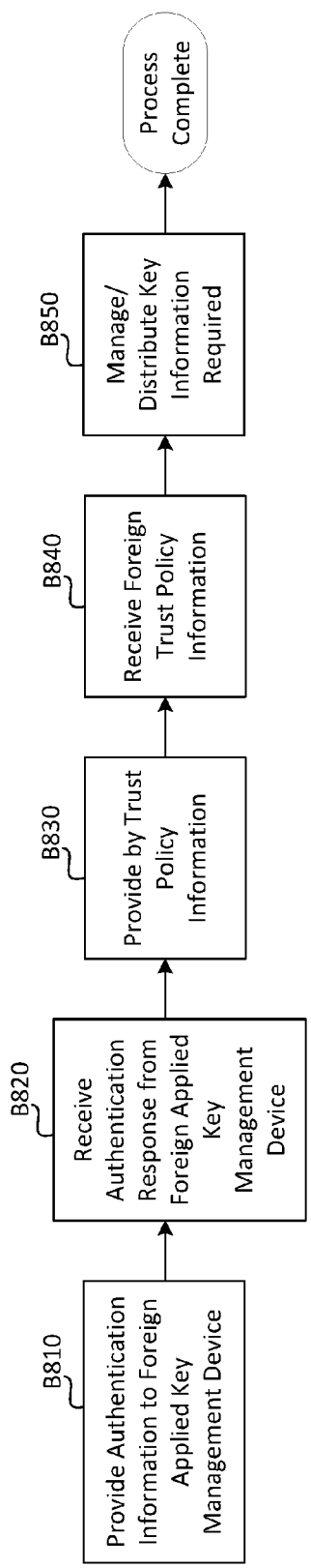
FIG. 8 is a process flow diagram illustrating an example of a key federation process according to various embodiments.

FIG. 8 is a process flow diagram illustrating an example of an encryption key federation process 800 according to various embodiments. Referring to FIGS. 1-8, applied key management devices 110 (e.g., both in a same local enterprise and in a foreign enterprise) may mutually authenticate and distribute encryption keys based on the policies 115 implemented for applied key management devices 110 or each enterprise for federating encryption keys from one enterprise to another enterprise. In addition, the encryption key federation process 800 may also include the receiving of encryption keys from a foreign applied key management device as a result of the federation policy of the foreign applied key management device.

First, at block B810, the local applied key management device (e.g., the applied key management device A 310a) may provide authentication information to a foreign applied key management device (e.g., the applied key management device B 310b). The authentication information may be any suitable authentication prompt and/or request for federation. Next, at block B820, the local applied key management device may receive authentication response from the foreign applied key management device agreeing to initiation the federation model. The blocks B810 and B820 may represent typical security credential handshakes, where federation trust has been established between the two enterprises.

Next, at block B830, the local applied key management device may provide trust policy information to the foreign applied key management device. At block B840, the local applied key management device may receive trust policy information from the foreign applied key management device. The trust policy information may include any configurations, settings, extent of trust, mutually agreed policies, a combination thereof, and/or the like.

Next, at block B850, the local applied key management device and the foreign applied key management device may manage and distribute key information (e.g., the encryption key, the associated key attributes 160, a combination thereof, and/or the like) in the manner described.

In particular embodiments, the foreign applied key management device transmit the request 175 to the local applied key management device for generating the encryption key for a communication transaction between a communication device associated with the foreign applied key management device and a communication device associated with the local applied key management device. The encryption key may be generated by the local applied key management device and inspected by local policy engine. The encryption key may be transmitted to the foreign applied key management device for inspection by the foreign policy engine in some embodiments, but not others.

In some embodiments, instead of the request 175, the foreign applied key management device may transmit a generated encryption key (which may or may not have been inspected by policy engine of the foreign applied key management device depending on trust policy information specified). The local applied key management device may or may not inspect the encryption key and its associated key attributes 160 by policies 115 based on the trust policy information specified between the enterprises.

Figure 9:
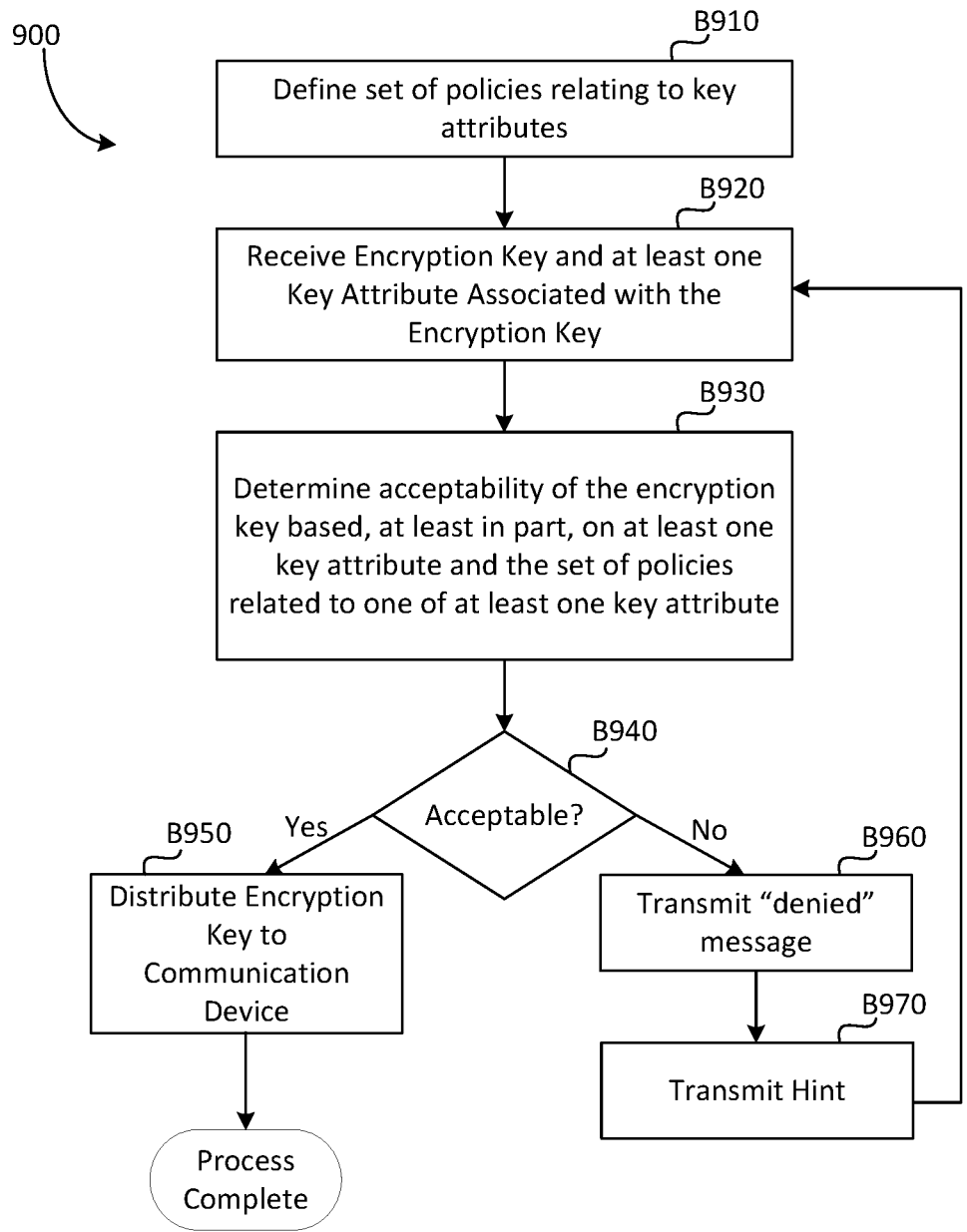
FIG. 9 is a process flow diagram illustrating an example of an encryption key management and distribution process according to various embodiments.

FIG. 9 is a process flow diagram illustrating an example of an encryption key management and distribution process 900 according to various embodiments. In various embodiments, the encryption key management and distribution process 900 may incorporate elements of applied key management, including key management, key distribution, and key federation.

First, at block B910, a set of policies 115 may be defined, where each policy 115 may relate to one or more key attributes 160. The policies 115 may be defined by designed personnel and stored in the policy database 280 for future retrieval and update. Next, at block B920, the management request handler 205 may receive encryption key and at least one key attribute associated with the encryption key from the key source 170 in the manner described.

Next, at block B930, the management request handler 205 may determine acceptability of the encryption key received based, at least in part, on the at least one key attribute and the set of policies 115 that relate to one of the at least one key attribute. For example, the management request handler 205 may check a value corresponding to a key attribute 160 to determine whether the value is within an acceptable range as defined by the policies 115 in the manner described.

Next, at block B940, the management request handler 205 may determine whether the encryption key is acceptable. Whereas the encryption key is acceptable (B940: YES), the management request handler 205 may distribute the encryption key to the communication devices requiring the key for the communication transaction therebetween, at block B950. On the other hand, whereas the encryption key is unacceptable (B940: NO), the management request handler 205 may transmit the "denied" message to the key source 170 at block B960. Optionally, the management request handler 205 may transmit the hint to the key source to facilitate key generation at block B970. The management request handler 205 may then standby until receiving a second encryption key (and associated key attributes 160) at block B920.

The applied key management system (e.g., the applied key management device 110, the management request handler 205, applied key management device A 310a, applied key management device B 310b, and/or the like) described herein may be implemented on any suitable computing devices having a processor and a memory device. The processor may include any suitable data processing device, such as a general-purpose processor (e.g., a microprocessor), but in the alternative, the processor may be any conventional processor, controller, microcontroller, or state machine. The processor may also be implemented as a combination of computing devices, e.g., a combination of a DSP and a microprocessor, a plurality of microprocessors, at least one microprocessor in conjunction with a DSP core, or any other such configuration. The memory may be operatively coupled to the processor and may include any suitable device for storing software and data for controlling and use by the processor to perform operations and functions described herein, including, but not limited to, random access memory RAM, read only memory ROM, floppy disks, hard disks, dongles or other RSB connected memory devices, or the like.

The applied key management device 110, the management request handler 205, applied key management device A 310a, and/or applied key management device B 310b may be implemented on suitable operating systems (OS) such as, but not limited to, the Linux OS, Windows, the Mac OS, and the like. Additionally, the applied key management device 110, the management request handler 205, applied key management device A 310a, and/or applied key management device B 310b may be implemented on small form factors such as embedded systems.

The embodiments described herein relate to encryptions keys. It should be appreciated by one of ordinary skills in the art that, in other embodiments, the systems and methods directed to the applied key management device 110 involving management, distribution, and federation may be likewise implemented for other sensitive objects such as, but not limited to, user identity information, certificates, biometric data, random number generator data, determinate random number generator data, non-determinate random number generator data, user authentication information, policy components, other components associated with organization security component, and/or the like.

Some embodiments described herein relate to an automated mechanism for integrating applied key management operations in relation to applications, servers, and/or infrastructure local to a client (e.g., a communication device). An interface (e.g., an applied key management client interface) may be provided to the client for interfacing with an encryption applied key management system. The encryption applied key management system may represent a unified platform providing encryption key management, federation, and/or distribution in the manner described herein. The encryption applied key management system may represent a centralized server for applied key management services (e.g., applied key management system 200).

Applied key management services may refer to various encryption key-related operations. For example, the operations of key management, key distribution, and key federation described herein with respect to the client device at which the applied key management client interface is located. In some embodiments, applied key management services include registering keys, requesting and retrieving keys, reykeying, or the like. In some embodiments, applied key management services include collecting local keys from a client and registering and/or storing the local keys at the applied key management system or at a third party location (e.g., in a secure key storage). In other embodiments, applied key management services includes secure distribution of public keys from a Public Key Infrastructure (PKI) while having minimal impact on existing technology of the client. In further embodiments, an applied key management client interface may integrate with email services of a client to allow access to automated distribution of public keys to the client.

In some embodiments, an applied key management client, such as, but not limited to, a Microsoft Windows Service or Linux Daemon may support local (e.g., at the client device) applied key management activities. Moreover, the applied key management client may provide an integration point with the applied key management system (e.g., by interfacing with an applied key management server at the applied key management system).

In some embodiments, as part of the applied key management client architecture, there may be provided a kernel or file driver that implements file system functionality as a virtual file systems component that represents the key store file (e.g., for a given Linux based workstation or server). The kernel or file driver may provide a KMIP-based or classX-based connection to the applied key management server to support policy-based encryption requests, as well as other applied key management operations, such as, but not limited to, device enrollment, key distribution, key federation, and/or the like.

In some embodiments, the applied key management client also provides local caching of key information for multiple sets of keys and for disparate applications and services with an applied key management device. Storage of keys may be dictated by applied key management policies 115 and relayed as part of key management messaging by being sent to the applied key management client from the applied key management server.

In some embodiments, a file or kernel driver of the applied key management client communicates with a user space service or daemon through local application of a Netlink protocol. In this regard, traditional file operations such as Read, Write, Open, and Close may be associated with applied key management functions to obtain key information, register key information, open a Netlink connection, and close the Netlink connection, respectively.

In various embodiments, the file or kernel driver of the applied key management client interface provides a simplistic integration mechanism by substituting an actual key file with a link to applied key management capabilities that provides files though applied key management security and policy. In some embodiments, the applied key management client can support multiple file substitutions at a single applied key management client.

In some embodiments, the applied key management client leverages an extensible architecture to also integrate with local key storage capabilities having Application Programming Interfaces (APIs) to provide a secured point of local interaction with certificate stores, such as, but not limited to, Microsoft and Mozilla stores associated with Microsoft Products and Firefox, respectfully.

As referred to herein, a "local key" may be an encryption key that is locally generated or locally stored. A locally-generated encryption key may be an encryption key installed or created as a part of licensing for an application of the client. A locally-stored encryption key may include any encryption key stored on the client (e.g., in a local key store of the client) that can be used for one or more applications on the client. The local key may be generated or stored on the client as an authoritative source of encryption key information for communication applications, storage applications, as well as other types of applications of the client. In some embodiments, a local key (or information of a local key) may include, but not be limited to, key file for secure data storage on the client, key data for Secure Shell (SSH) on the client, license key for an application on the client, and/or the like.

The applied key management client interface may be tasked with reading the local key store or a remote key store and selecting a local key or remote key to be stored in and/or registered with the secure key storage. The applied key management client interface may send the request to register, retrieve, and/or store the key to the encryption applied key management system. The encryption applied key management system may evaluate the request against at least one (e.g., first policy) of the policies 115 to determine whether the request is authorized. In response to determining that the request is authorized, the encryption applied key management system may register, send, and/or store the local key in or with the secure key storage.

Figure 10:
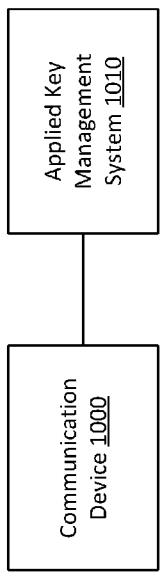
FIG. 10 is a schematic block diagram illustrating an example of relationship between a communication device, encryption applied key management system, and secure key storage according to various embodiments.

FIG. 10 is a schematic block diagram illustrating an example of relationship between a communication device 1000 and an encryption applied key management system 1010 according to various embodiments. Referring to FIGS. 1-10, the communication device 1000 may be the client. In some embodiments, the communication device 1000 may be a device such as, but not limited to, the source device 150a, the target device 150b, the cellular device 250a, the network device 250b, . . . , the device N 250n, the device A 350a, the device B 350b, a combination thereof, and/or the like. The encryption applied key management system 1010 may be a server or system such as, but not limited to, the general encryption applied key management system 100, encryption applied key management system 200, and/or the like.

The communication device 1000 may be connected to the encryption applied key management system 1010 via any suitable (wired or wireless) network link. The network link may be secured or unsecured. For example, the network link may be a wide area communication network, such as, but not limited to, the internet, or one or more intranets, LANs, Ethernet networks, MANs, a WAN, combinations thereof, or the like. In particular embodiments, the network link may represent one or more secure network links configured with suitable security features, such as, but not limited to, firewalls, encryption, or other software or hardware configurations that inhibits access to network communications by unauthorized personnel or entities.

Figure 11:
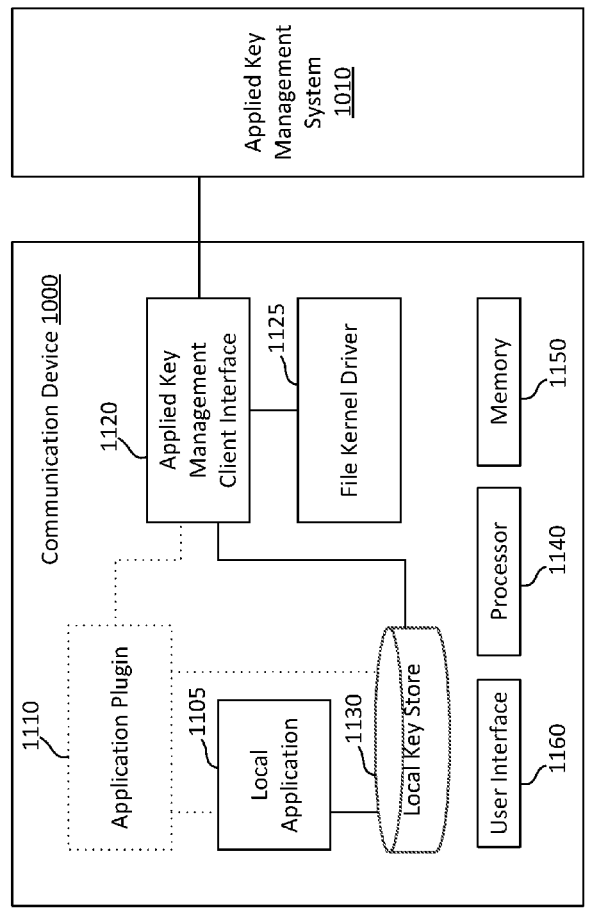
FIG. 11 is a schematic block diagram illustrating an example of the communication device according to some embodiments.

FIG. 11 is a schematic block diagram illustrating an example of the communication device 1000 of FIG. 10 according to some embodiments. Referring to FIGS. 1-11, the communication device 1000 may include a local application 1105, application plugin 1110, applied key management client interface 1120, file kernel driver 1125, and local key store 1130. In some embodiments, the communication device 1000 may correspond to the communication device 400. For example, the local application 1105 may correspond to one or more of the email application 410a, VOIP application 410b, storage encryption 410c, and/or other encryption applications 410d. The local key store 1130 may correspond to the key store 440. The application plugin 1110 may correspond to the application interface 420. The applied key management client interface 1120 may correspond to support configurations and/or interfaces between the KMIP Proxy 430 and one or more of the application interface 420, key store 440, or device end cryptographic unit 450.

In some embodiments, the communication device 1000 may be a desktop computer, mainframe computer, server computer, laptop computer, tablet device, smart phone device or the like, configured with hardware and software to perform operations described herein. For example, the communication device 1000 may include a typical desktop Personal Computer (PC) or Apple™ computer device, having suitable processing capabilities, memory, user interface (e.g., display and input) capabilities, and communication capabilities, when configured with suitable application software (or other software) to perform operations described herein. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the communication device 1000 may include to dedicated device hardware specifically configured for performing operations described herein.

In some embodiments, the application plugin 1110 may access the local key store 1130 to determine whether a local key associated with the local application 1105 may need to be registered and/or stored. In response to determining that a local key need to be registered and/or stored, the application plugin 1110 may notify the applied key management client interface 1120 to initiate a request for registering and/or storing the local key. In other embodiments, the application plugin 1110 may not be provided, and the applied key management client interface 1120 may access the local key store 1130 to determine whether a local key associated with the local application 1105 may need to be registered and/or stored.

In some embodiments, the application plugin 1110 may be an email client plugin and be an integration point between an email application and the applied key management client interface 1120. The email client plugin may access the local key store 1130 to determine whether a public key (e.g., a recipient's public key) associated with an email application of the communication device 1000 is available. In response to determining that a public key is not available for a given recipient, the email client plugin may notify the applied key management client interface 1120 to initiate a request for the public key. In some embodiments, the email client plugin may determine that a public key is not available in response to determining one or more of the public key not being present in the local key store 1130, the public key being expired and thus needing renewal, the public key being revoked, and/or the like.

In some embodiments, the local key store 1130 may be a memory device (e.g., a cache, a database, and/or the like) used to store security objects such as local keys on the communication device 1000. In some embodiments, the local application 1105 may use the local keys stored in the local key store 1130. Illustrating with a non-limiting example, the local key store 1130 may be a Microsoft key store, Mozilla key store, and/or the like.

In some embodiments, the applied key management client interface 1120 may be a communication component (e.g., a service module or daemon) of the communication device 1000 for communicating with the encryption applied key management system 1010. In particular embodiments, the applied key management client interface provided to the client may be a Microsoft Windows Service, Linux Daemon, or other suitable interfaces for providing a platform for local activities at the client and to provide an integration point with the encryption applied key management system.

The applied key management client interface 1120 may be provided to the communication device 1000 as a software component for installation and/or update to enable interfacing with the encryption applied key management system 1010, given that the communication device 1000 may not have capacity to support direct communication with the encryption applied key management system 1010 natively.

The applied key management client interface 1120 may communicate with one or more of the application plugin 1110, local key store 1130, or the encryption applied key management system 1010 (e.g., an applied key management server interface 1210 of FIG. 12) via Transmission Control Protocol (TCP), Transport Layer Security (TLS) protocol, Secure Socket Layer (SSL) protocol, or the like. In some embodiments, the applied key management client interface 1120 may communicate with one or more of the application plugin 1110, local key store 1130, or the encryption applied key management system 1010 (e.g., an applied key management server interface 1210 shown in FIG. 12) via KMIP protocol or other suitable communication protocols.

In some embodiments, the applied key management client interface 1120 may support key management operations on the communication device 1000 such as, but not limited to, sending requests for registering and/or storing the local key to the encryption applied key management system 1010. In some embodiments, the applied key management client interface 1120 may be connected to the local key store 1130 for reading local keys stored in the local key store 1130 and determining whether the local keys need to be registered and/or stored. The applied key management client interface 1120 may send the requests in response to determining that the local keys need to be registered and/or stored.

Alternatively, the applied key management client interface 1120 may receive the local keys that need to be registered and/or stored from the application plugin 1110. The applied key management client interface 1120 may send the requests in response to the application plugin 1110 determining that the local keys need to be registered and/or stored.

In some embodiments, the applied key management client interface 1120 may support key management operations on the communication device 1000 such as, but not limited to, sending requests for obtaining public keys or rekeying requests to the applied key management system 1010. In some embodiments, the applied key management client interface 1120 may be connected to the local key store 1130 for distributing (e.g., adding, manipulating, writing, or inserting) encryption keys obtained from the applied key management system 1010 to the local key store 1130, to be used for the email application 1105. The applied key management client interface 1120 may send the requests in response to the email client plugin 1110 determining that a public key is not available.

In some embodiments, the file kernel driver 1125 may be a driver and/or kernel for establishing connection with the encryption applied key management system 1010. In other words, the file kernel driver 1125 may be a software module for providing configurations related to file access operations concerning security objects such as encryption keys (e.g., the local keys). In particular, the file kernel driver 1125 may configure the applied key management client interface 1120 to communicate with the encryption applied key management system 1010 via KMIP-based or class X-based connections. The file kernel driver 1125 may configure the applied key management client interface 1120 to send the request to the encryption applied key management system 1010 in some embodiments.

In some embodiments, the file kernel driver 1125 may configure the applied key management client interface 1120 to open connection with the encryption applied key management system 1010, read or get a file from the encryption applied key management system 1010, register/enroll the communication device 1000 with the encryption applied key management system 1010 (in a manner such as, but not limited to, described with respect to the communication device registration process 600), close connection with the encryption applied key management system 1010, and/or the like. Illustrating with a non-limiting example, the file kernel driver 1125 may be a Linux Kernel Driver, Windows File Driver, or the like. The file kernel driver 1125 may be connected to the applied key management client interface via an interface such as, but not limited to, Netlink.

One or more of the local application 1105, application plugin 1110, applied key management client interface 1120, or file kernel driver 1125 may be implemented by a processor 1140. The processor 1140 may include any suitable data processing device, such as a general-purpose processor (e.g., a microprocessor). In the alternative, the processor 1140 may be any conventional processor, controller, microcontroller, or state machine. The processor 1140 may also be implemented as a combination of computing devices, e.g., a combination of a Digital Signal Processor (DSP) and a microprocessor, a plurality of microprocessors, at least one microprocessor in conjunction with a DSP core, or any other such configuration. The processor 1140 may be configured with processor-readable instructions to perform features and functions of various components of the communication device 1000 as described herein.

A memory 1150 may be operatively coupled to the processor 1140 and may include any suitable non-transitory computer-readable device for storing software and data for controlling the processor 1140 to perform operations and functions described herein. The memory 1150 may include, but not limited to, a Random Access Memory (RAM), Read Only Memory (ROM), floppy disks, hard disks, dongles, or Recomp Sensory Board (RSB) connected memory devices, or the like. In some embodiments, the memory 1150 may be implemented with cloud storage. In some embodiments, local key store 1130 may be separate from the memory 1150. In other embodiments, the local key store 1130 may be a part of the memory 1150.

In some embodiments, the communication device 1000 may include a user interface 1160. The user interface 1160 may include at least one output device. The output device may include any suitable device that provides a human-perceptible visible signal, audible signal, tactile signal, or any combination thereof, including, but not limited to a touchscreen, Liquid Crystal Display (LCD), Light Emitting Diode (LED), Cathode Ray Tube (CRT), plasma, or other suitable display screen, audio speaker or other audio generating device, combinations thereof, or the like.

In some embodiments, the user interface 1160 may include at least one input device that provides an interface for operator (such as enterprise employees, technicians, or other authorized users) to access the communication device 1000. The input device may include any suitable device that receives input from a user including, but not limited to, one or more manual operator (such as, but not limited to a switch, button, touchscreen, knob, mouse, keyboard, keypad, slider or the like), microphone, or the like. In some embodiments, the input device may allow the operator to input information related to operating the local application.

In other embodiments, the applied key management client interface 1120 may likewise be implemented with other suitable applications on the communication device 1000 (400), including, but not limited to, the VOIP application 410*b*, storage encryption 410*c*, and/or other encryption applications 410*d* coupled to the application interface 420.

Figure 12:
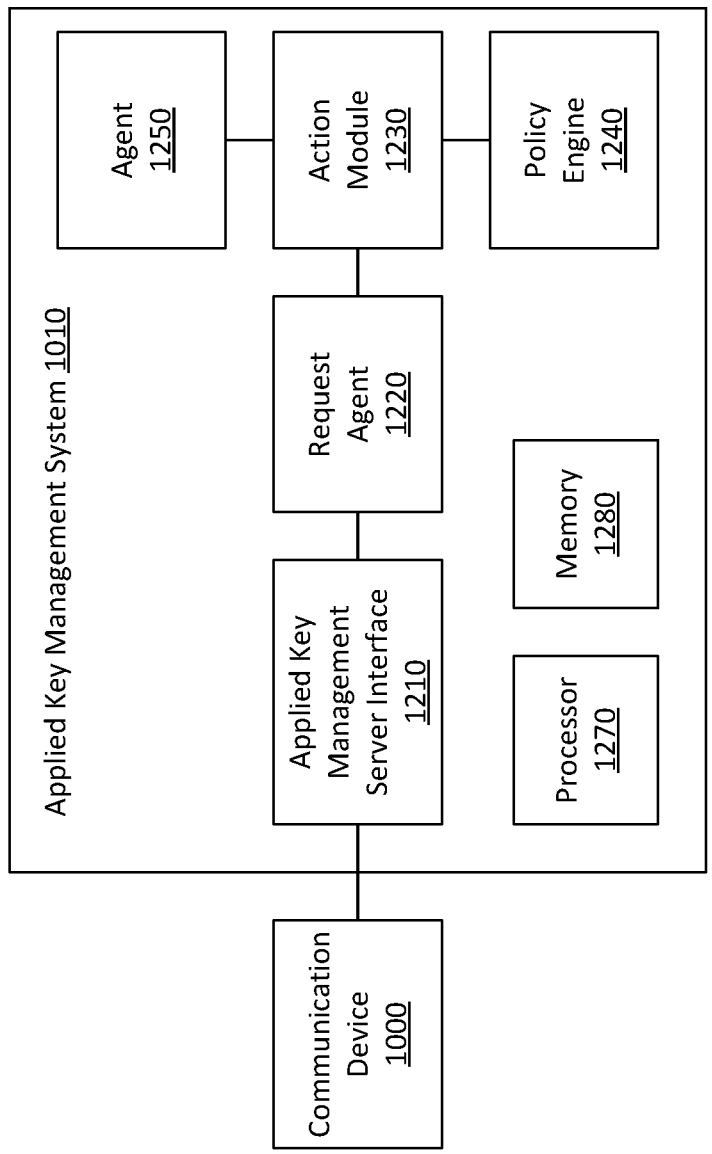
FIG. 12 is a schematic block diagram illustrating an example of an encryption applied key management system according to some embodiments.

FIG. 12 is a schematic block diagram illustrating an example of an encryption applied key management system 1010 according to some embodiments. Referring to FIGS. 1-12, the encryption applied key management system 1010 may include an applied key management server interface 1210, request agent 1220, action module 1230, policy engine 1240, and agent 1250. In some embodiments, the encryption applied key management system 1010 may correspond to the encryption applied key management system 200 in some embodiments. For example, the applied key management server interface 1210 may correspond to the request handler 210. The request agent 1220, action module 1230, policy engine 1240, and agent 1250 may be implemented with the management request handler 205.

In some embodiments, the applied key management server interface 1210 may communicate with the communication device 1000 (e.g., the applied key management client interface 1120) via TCP, TLS protocol, SSL protocol, or the like. The applied key management server interface 1210 may receive communications (e.g., requests) from the communication device 1000. In some embodiments, the request corresponding to a local key may include one or more of the local key (e.g., the key attributes 160 of the local key), application identifier identifying an application (e.g., the local application 1105) associated with the local key, user identifier (e.g., a user account or credential) identifying a user authorized to use the local key, a device identifier identifying the communication device 1000, time at which the local key may be collected by the application plugin 1110 or the applied key management client interface 1120, or the like.

The applied key management server interface 1210 may additionally receive a recovery request from the communication device 1000 for recovering (e.g., obtaining) a previously registered and/or stored local key. The applied key management server interface 1210 may then send the previously registered and/or stored local key to the communication device 1000. The applied key management server interface 1210 may send key information related to public keys obtained from a PKI to the communication device 1000. The applied key management server interface 1210 may send the received request for a public key to the request agent 1220.

In some embodiments, the applied key management server interface 1210 may have capacity to communicate with multiple devices such as, but not limited to, the communication device 1000 for the activities described herein, enabling an "N-to-1" interface.

The applied key management server interface 1210 may send the received request for registering and/or storing a local key to the request agent 1220. In some embodiments, the request agent 1220 may receive the request for registering and/or storing a local key from the applied key management server interface 1210 and generate an action request (or job request) based on the request. In other words, the request agent 1220 may be an interface between the applied key management server interface 1210 and the action module 1230. The action request may correspond to the request of the communication device 1000 for registering and/or storing a local key. For example, the action request may include one or more of the local key (e.g., the key attributes 160 of the local key), application identifier identifying an application (e.g., the local application) associated with the local key, user identifier (e.g., a user account or credential) identifying a user authorized to use the local key, a device identifier identifying the communication device 1000, time at which the local key may be collected by the application plugin 1110 or the applied key management client interface 1120, or the like.

In some embodiments, an action module 1230 may receive the action request sent by the request agent 1220 and process the action request. For example, the action module 1230 may send information included in the action request to the policy engine 1240 for evaluation based on the policies 115 (e.g., the first policies). The first policies may include some of the policies 115 used to evaluate whether with the request to register and/or store the local key can be authorized. In response to determining that registration and/or storage of the local key is authorized according to the first policies, the action module 1230 may send a request to a local or remote secure key storage. An agent 1250 may be coupled to the action module 1230 to provide configuration for the action module 1230. In some embodiments, the agent 1250 may perform some or all of the functions of the action module 1230 described herein.

In some embodiments, the request agent 1220 may receive a request for a public key from the applied key management server interface 1210 and generate an action request (or job request) based on the request. The action request may correspond to the request of the communication device 1000 for obtaining a public key. For example, the action request may include one or more of an email address or account identifier identifying the recipient whose public key may be unavailable or an identifier representing the communication device 1000.

In some embodiments, the action module 1230 may include a job management module, job module, and transaction module. The job management module may control creation, updating, executing, and deletion of the jobs or action requests. In some embodiments, the job management module may present the action request for inspection by the policy engine 1240 based on the first policies. In particular, the policy engine 1240 may determine whether the communication device 1000 identified by the device identifier is authorized to make any registration and/or storage request based on the relevant first policies stored in the policy database 280 or a cache memory. In response to determining that the communication device 1000 is authorized, the job management module may generate an action based on the action request and send the action to the job module. In some embodiments, the policy engine 1240 may determine whether the communication device 1000 identified by the identifier is authorized to request a public key based on the relevant policies 115 stored in the policy database 280 or a cache memory.

In some embodiments, the job module may manage a composite set of actions (e.g., various queued actions) for various devices, including the communication device 1000. For each action in a queue maintained by the job module, the job module may create a transaction to connect to a given secure storage for registering and/or storing the local key. The job module may group two or more of the transactions into composite transactions. Illustrating with a non-limiting example, transactions to register and/or store the local keys to a same secure key storage may be grouped into a composite transaction. Illustrating with another non-limiting example, transactions to register and/or store local keys in a given time interval may be grouped into a composite transaction. Illustrating with yet another non-limiting example, transactions to register and/or store local keys for a same device (e.g., the communication device 1000) may be grouped into a composite transaction. In some embodiments, the job module may present the composite transactions and/or singular transactions to the policy engine 1240 for evaluation based on the first policies. In response to determining that a given transaction is authorized based on the first policies, the job module may send the transaction to the transaction module for execution.

In other embodiments, for each action in a queue maintained by the job module, the job module may create a transaction to connect to a given PKI for obtaining a public key. The job module may group two or more of the transactions into composite transactions. Illustrating with a non-limiting example, transactions to obtain public keys from a same PKI may be grouped into a composite transaction. Illustrating with another non-limiting example, transactions to obtain public keys in a given time interval may be grouped into a composite transaction. Illustrating with yet another non-limiting example, transactions to obtain public keys for a same device (e.g., the communication device 1000) may be grouped into a composite transaction. In some embodiments, the job module may present the composite transactions and/or singular transactions to the policy engine 1240 for evaluation based on the policies 115. In response to determining that a given transaction is authorized based on the policies 115, the job module may send the transaction to the transaction module for execution.

The transaction module may receive the transaction from the job module and execute the transaction. For example, the transaction module may request a secure key storage to register and/or store local keys requested by the communication device 1000. In response to determining that the transaction cannot be completed or in response to determining that the transaction fails, the transaction module may present the failure to the policy engine 1240 for evaluation based on the first policies. The first policies may indicate a post-failure transaction based on one or more of a type of failure, the identity of the communication device 1000, the identity of the particular secure key storage, or the like. Post-failure transaction may be, for example, retransmitting the request to the secure key storage periodically for the next 10 seconds if the failure is a communication failure (e.g., faulty network connection) to reach the secure key storage known to be currently active. In another example, the post-failure transaction may be sending the communication device 1000 a failure message if the secure key storage is currently offline or if the first policies do not authorize registering/storing the local key.

In other embodiments, the transaction module may request a PKI via a PKI interface to issue a public key requested by the communication device 1000. In response to determining that the transaction cannot be completed or in response to determining that the transaction fails, the transaction module may present the failure to the policy engine 1240 for evaluation based on the policies 115. The policies 115 may indicate a post-failure transaction based on one or more of a type of failure, the identity of the communication device 1000, the identity of the particular PKI, or the like. Post-failure transaction may be, for example, retransmitting the request to the PKI infrastructure periodically for the next 10 seconds if the failure is a communication failure (e.g., faulty network connection) to reach a Certificate Authority known to be currently active. In another example, the post-failure transaction may be sending the communication device 1000 a failure message if a Certificate Authority is currently offline or if the policies 115 do not authorize obtaining the public key.

One or more of the applied key management server interface 1210, request agent 1220, action module 1230, policy engine 1240, or agent 1250 may be implemented by a processor 1270. The processor 1270 may include any suitable data processing device, such as a general-purpose processor (e.g., a microprocessor). In the alternative, the processor 1270 may be any conventional processor, controller, microcontroller, or state machine. The processor 1270 may also be implemented as a combination of computing devices, e.g., a combination of a DSP and a microprocessor, a plurality of microprocessors, at least one microprocessor in conjunction with a DSP core, or any other such configuration. The processor 1270 may be configured with processor-readable instructions to perform features and functions of various components of the encryption applied key management system 1010 as described herein.

A memory 1280 may be operatively coupled to the processor 1270 and may include any suitable non-transitory computer-readable device for storing software and data for controlling the processor 1270 to perform operations and functions described herein. The memory 1280 may include, but not be limited to, a RAM, ROM, floppy disks, hard disks, dongles, or RSB connected memory devices, or the like. In some embodiments, the memory 1280 may be implemented with cloud storage.

Accordingly, in various embodiments, systems and methods are directed to providing a client-based service that exposes applied key management operations and policy from the applied key management application or appliance (e.g., the applied key management system 1010) to local applications, servers, and infrastructure (e.g., the communication device 1000) that does not have defined applied key management interfaces. Additionally, the applied key management application leverages a kernel or file driver interface to provide applied key management services to client applications with minimal changes to supported applications. This is accomplished by having the file kernel driver interface provide capabilities for file operations such as open, close, read, and write. Furthermore, the applied key management client provides an extensible interface to integrate with other applications (e.g., the application plugin 1110) that have specific APIs for local encryption management.

In various embodiments, the applied key management server interface 1210 represents the messaging component of the applied key management system 1010 that interacts with the applied key management client (e.g., the communication device 1000). In this regard, the applied key management server interface 1210 can both initiate and respond to messages from the client. Messages that are initiated from the applied key management server interface 1210 include, but are not limited to, sending of encryption key information or encryption management information to the client. In various embodiments, message traffic can originate from either the applied key management server interface 1210 or the applied key management client interface 1120, depending on the operation.

In some embodiments, the applied key management client interface 1120 represents the local applied key management infrastructure at the client (e.g., at the communication device 1000) for supporting applications that cannot natively enable direct management from the applied key management system 1010. In some embodiments, the applied key management client interface 1120 can communicate using KMIP protocol, as well as other communication protocols. The communication protocol used by the client interface 1120 may support how the device having the applied key management client interface 1120 installed interoperates with local applications at the client and the applied key management enterprise as a whole.

In particular embodiments, the client may utilize the Netlink protocol between the file kernel driver 1125 and the applied key management client interface 1120. In such embodiments, the Netlink communication protocol provides a mechanism for communication between kernel space and user space operations within the communication device 1000.

In some embodiments, as applied key management is focused on encryption keys, the commands executed by the applied key management client interface 1120 may be focused on support key management operations, such as, but not limited to, obtaining keys or sending rekey requests to the applied key management system 1010 (e.g., to the applied key management server interface 1210).

In some embodiments, the applied key management client interface 1120 also has access to the local key store 1130 used to cache key information locally (e.g., in accordance with applied key management policies 115) and to the communication device's 1000 configuration, which includes information associated with the local operation of the applied key management client interface 1120.

In some embodiments, the file kernel driver 1125 represents the capability to extend file access operations associated with encryption key material to invoke applied key management operations on both the communication device 1000 and the applied key management system 1010. In one example, when a file is opened (e.g., when the Open operation is executed), the file kernel driver 1125 may open a Netlink connection with the applied key management client interface 1120 as a precursor to subsequent applied key management operations. In another example, the Read operation (e.g., at the file kernel driver 1125) may trigger the communication device 1000 to retrieve requested encryption key information from the local key store 1130 or from the applied key management system 1010. In another example, the Write operation can be used to register key information back to the applied key management system 1010. In another example, a Close operation can close the Netlink connection to the applied key management client interface 1120.

In some embodiments, at the communication device 1000, requests are transmitted from the file kernel driver 1125 in the kernel space to the applied key management client interface 1120 in the user space, and responses to the requests are transmitted from the applied key management client interface 1120 in the user space to the kernel file driver 1125 in the kernel space.

In various embodiments, the local key store 1130 represents another location in which key material can be stored and that is located within the same system as the communication device 1000. In various embodiments, the application plugin 1110 represents an extension at which the communication device 1000 can leverage its extensibility to interface with other applications through exposed APIs or through limited use of scripting, such as, but not limited to, interaction with Microsoft key stores or Mozilla Firefox key stores.

In some embodiments, the communication device 1000 is capable of enrolling itself with the applied key management system 1010. For example, in a device that previously did not having the capability to interface with the applied key management system 1010, but later obtained that capability (e.g., via installation of the applied key management client interface 1120), the device may be enrolled in the applied key management system 1010 to receive the applied key management services. In some embodiments, the communication device 1000 may transmit (via the applied key management client interface 1120) enrollment information to the applied key management system 1010 (e.g., in response to a request from the applied key management system 1010 sent to the communication device 1000 via the applied key management client interface 1120).

The enrollment information may include a serial number of the device, a date of manufacture, a unique identifier, or the like. In response to its enrollment in the applied key management system 1010, the system 1010 may store the device information in one of its databases (e.g., device inventory database 295). After the enrollment process is complete, the communication device 1000 may receive applied key management services from the applied key management system 1010 via the applied key management client interface 1120. In some embodiments, the communication device 1000 is capable of erasing its enrollment with the applied key management system 1010.

In some embodiments, the applied key management client interface 1120 is capable of interacting with local client applications at the communication device 1000 (in addition to interacting with the applied key management system 1010). In some embodiments, the applied key management client interface 1120 sends public key information associated with a secure messaging service application that have an encryption management API (for connecting to the applied key management client interface 1120). In some embodiments, the applied key management client interface 1120 sends Pretty Good Privacy (PGP) key information associated with secure messaging services that have an encryption management API (for connecting to the applied key management client interface 1120). In some embodiments, the applied key management client interface 1120 provides an applied key management services interface for policy-based key lifecycle functions. In some embodiments, the applied key management client interface 1120 provides auditing and logging services associated with policy-based implementation of key lifecycle functions.

Figure 13:
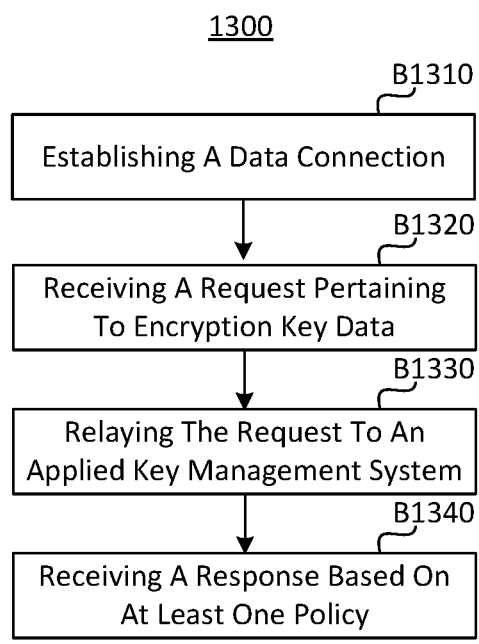
FIG. 13 is a process flow diagram illustrating an example of a method for enabling applied key management operations according to various embodiments.

FIG. 13 is a process flow diagram illustrating an example of a method 1300 for enabling applied key management operations according to various embodiments. Referring to FIGS. 1-13, at step B1310, the method includes establishing a data connection to enable the applied key management operation. In some embodiments, the filr kernel driver 1125 performs an Open operation to establish the connection with the applied key management client interface 1120. In some embodiments, the connection is established in response to an indication at the communication device 1000 that a service performed by the applied key management system 1010 is needed. For example, the communication device 1000 may need to encrypt a message to be sent to another device, and therefore may need a suitable key for the encryption from the applied key management system 1010. Accordingly, in response to the indication that a key is required, the file kernel driver 1125 may establish the connection with the applied key management client interface 1120 for interacting with the applied key management system 1010 (e.g., for obtaining a key for the message).

In some embodiments, at step B 1320, the method 1300 includes receiving a request pertaining to encryption key data. The request may be sent from the file kernel driver 1125 and received at the applied key management client interface 1120. In some embodiments, the file kernel driver 1125 establishes a connection with the applied key management client interface 1120 (e.g., by executing the Open operation) before sending the request. The connection between the applied key management client interface 1120 and the file kernel driver 1125 may be a Netlink connection.

In some embodiments, the request is any one of various applied key management operations provided by the applied key management system 1010. For example, the request may be a request to register the encryption key data with the applied key management system 1010. In some embodiments, the registration function pertains to the registration of a certificate, a key store, a symmetric key, an asymmetric key, or the like. As another example, the request may be a request to retrieve the encryption key data, such as, but not limited to, a certificate, a key store, a symmetric key, an asymmetric key, or the like, from the applied key management system 1010. As another example, the request may be a request for recertification (e.g., of a certificate) or rekey (e.g., for a key).

In some embodiments, at step B 1330, the method 1300 includes relaying the request to an applied key management system. The request may be relayed by the applied key management client interface to the applied key management system 1010 (e.g., to the applied key management server interface 1210 of the applied key management system 1010). In some embodiments, the connection between the communication device 1000 and the applied key management system 1010 is a TCP or a TLS data connection for sending the request.

In other embodiments, instead of relaying the request to the applied key management system 1010, the applied key management client interface 1120 can process the request on its own if the request is able to be processed locally. For example, if the request is for a key that is stored locally (e.g., at local key store 1130), the applied key management client interface 1120 can retrieve the key from the local key store 1130, which may be connectable to the applied key management client interface 1120 by an API. Accordingly, in various embodiments, the applied key management client interface 1120 not only provides interface between the communication device 1000 and the applied key management system 1010, but it also may interface with local applications at the communication device 1000, such as the local key store 1130. In some embodiments, the applied key management client interface may interface with any other desired application (e.g., application plugin 1110) at the communication device 1000.

In some embodiments, at step B 1340, the method 1300 includes receiving a response based on at least one policy. Once the request is received at the applied key management system 1010 via the applied key management server interface 1210, the system 1010 may evaluate the request based on one or more of the policies 115. In some embodiments, if the request fails a policy, the applied key management system 1010 may send a response to the communication device 1000 indicating the error. For example, if the communication device 1000 is requesting to register a key with the applied key management system 1010, the applied key management system 1010 may evaluate the key attributes of the requested key against one or more of the policies 115. In some embodiments, if the key fails one or more of the policies 115, the applied key management system 1010 may send an indication that the key was not registered.

However, if the request pertaining to the encryption key data passes the relevant policies (as evaluated by the applied key management system 1010), the applied key management system 1010 may send the requested encryption key data to the communication device 1000. For example, if the communication device 1000 requests registration of a key, and the key attributes of the key pass all the relevant policies 115, the applied key management system 1010 may register the key and transmit an indication of success of the registration to the communication device 1000.

In some embodiments, the request may be a request for a key. In such embodiments, the applied key management system 1010 may generate a suitable key for use at the communication device 1000, and send the key to the applied key management client interface 1120. Accordingly, the applied key management client interface 1120 may send the key to any component in the communication device 1000 for encryption purposes, as described herein. For example, the application plugin 1110 may use the key for encrypting a message to be sent from the communication device 1000 to another device. As another example, the local key store 1130 may use the key to encrypt data, as described herein. In other embodiments, the communication device 1000 may utilize keys received via the applied key management client interface 1120 as needed and as described herein.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes Compact Disc (CD), laser disc, optical disc, Digital Versatile Disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for enabling an applied key management operation at a client, the method comprising:
    establishing a data connection with a file kernel driver of the client to enable the applied key management operation;
    receiving from the file kernel driver a request pertaining to encryption key data;
    relaying the request pertaining to the encryption key data to an applied key management system; and
    receiving a response to the request from the applied key management system based on at least one policy of the applied key management system,
    wherein the file kernel driver is configured to substitute a key file with a link to invoke the applied key management operation; and
    wherein the link to invoke the applied key management operation causes the applied key management operation to be executed in response to a file access operation being executed on an encryption key material.

2. The method of claim 1, wherein the request comprises a request to register the encryption key data with the applied key management system.

3. The method of claim 1, wherein the request comprises a request to send the encryption key data.

4. The method of claim 3, further comprising:
    retrieving the encryption key data from a local key store at the client; and
    sending the encryption key data.

5. The method of claim 1, wherein the request comprises a request for recertification or for rekeying.

6. The method of claim 1, wherein the encryption key data comprises one of a certificate, a key store, a symmetric key, or an asymmetric key.

7. The method of claim 1, further comprising:
    receiving a key that complies with the at least one policy from the applied key management server; and
    relaying the key to an application plugin at the client for data encryption.

8. The method of claim 1, further comprising closing the connection with the file kernel driver after receiving the response from the applied key management system.

9. The method of claim 1, wherein the established connection with the file kernel driver is a Netlink connection.

10. The method of claim 1, wherein the response comprises a denial of the request based on the at least one policy of the applied key management system.

11. A system for enabling applied key management operations at a client, the system comprising:
    a memory; and
    a processor configured to:
        establish a data connection with a file kernel driver of the client to enable the applied key management operation;
        receive a request pertaining to encryption key data;
        relay the request pertaining to the encryption key data to an applied key management system; and
            receive a response to the request from the applied key management system based on at least one policy of the applied key management system,
    wherein the file kernel driver is configured to substitute a key file with a link to invoke the applied key management operation; and
    wherein the link to invoke the applied key management operation causes the applied key management operation to be executed in response to a file access operation being executed on an encryption key material.

12. The system of claim 11, wherein the request comprises a request to register the encryption key data with the applied key management system.

13. The system of claim 11, wherein the request comprises a request to send the encryption key data.

14. The system of claim 13, wherein the processor is further configured to:
    retrieve the encryption key data from a local key store at the client; and
    send the encryption key data.

15. The system of claim 11, wherein the request comprises a request for recertification or for rekeying.

16. The system of claim 11, wherein the encryption key data comprises one of a certificate, a key store, a symmetric key, or an asymmetric key.

17. The system of claim 1, wherein the processor is further configured to:
  receive a key that complies with the at least one policy from the applied key management server; and
  relay the key to an application plugin at the client for data encryption.

18. The system of claim 17, wherein the processor is further configured to close the connection with the file kernel driver after receiving the response from the applied key management system.

19. The system method of claim 17, wherein the established connection with the file kernel driver is a Netlink connection.

20. The system of claim 11, wherein the response comprises a denial of the request based on the at least one policy of the applied key management system.

21. The method of claim 1, wherein the applied key management operation comprises at least one of:
  opening a Netlink connection with the file kernel driver, when the file access operation is an Open operation;
  retrieving encryption key information, when the file access operation is a Read operation;
  registering encryption key information, when the file access operation is a Write operation; or
  closing the Netlink connection with the file kernel driver, when the file access operation is a Close operation.

* * * * *